(12) United States Patent
Okumura

(10) Patent No.: US 10,291,844 B2
(45) Date of Patent: May 14, 2019

(54) IMAGE PROCESSING APPARATUS, IMAGE PROCESSING METHOD, RECORDING MEDIUM, PROGRAM AND IMAGING-CAPTURING APPARATUS

(71) Applicant: REALOP CORPORATION, Yokohama-shi, Kanagawa (JP)

(72) Inventor: Akihiro Okumura, Yokohama (JP)

(73) Assignee: REALOP CORPORATION, Yokohama-Shi, Kanagawa (JP)

( * ) Notice: Subject to any disclaimer, the term of this patent is extended or adjusted under 35 U.S.C. 154(b) by 0 days.

(21) Appl. No.: 15/740,568

(22) PCT Filed: Mar. 14, 2016

(86) PCT No.: PCT/JP2016/057997
§ 371 (c)(1),
(2) Date: Dec. 28, 2017

(87) PCT Pub. No.: WO2017/158690
PCT Pub. Date: Sep. 21, 2017

(65) Prior Publication Data
US 2018/0198977 A1    Jul. 12, 2018

(51) Int. Cl.
*H04N 5/225*    (2006.01)
*H04N 5/232*    (2006.01)
(Continued)

(52) U.S. Cl.
CPC ..... *H04N 5/23229* (2013.01); *G02B 27/0037* (2013.01); *G06T 5/00* (2013.01); *H04N 5/3572* (2013.01)

(58) Field of Classification Search
None
See application file for complete search history.

(56) References Cited

U.S. PATENT DOCUMENTS

| 2001/0014180 A1* | 8/2001 | Ejiri | G06T 5/006 382/275 |
| 2004/0150732 A1* | 8/2004 | Yamanaka | H04N 9/045 348/272 |

(Continued)

FOREIGN PATENT DOCUMENTS

CN    1671176 A    9/2005
CN    102208098 A    10/2011
(Continued)

OTHER PUBLICATIONS

International Search Report of International Application No. PCT/JP2016/057997 dated Apr. 26, 2016.

*Primary Examiner* — Twyler L Haskins
*Assistant Examiner* — Dwight Alex C Tejano
(74) *Attorney, Agent, or Firm* — Bacon & Thomas, PLLC

(57) ABSTRACT

An image processing apparatus includes: an image storage unit storing a first image affected by aberration of an optical system; a position information generation unit generating position information about a pixel of the first image corresponding to a scanned target pixel on the basis of position information about the target pixel scanned in the predetermined order and a distortion aberration table; an image output unit outputting a first image in which distortion aberration correction is performed in units of one pixel based on integer information about the position information generated by the position information generation unit; a first aberration correction unit, using fractional part information about the position information, correcting phase shift caused by distortion aberration for each pixel of the first image; and a second aberration correction unit generating the second image by correcting aberration other than distortion aberration in the first image.

13 Claims, 21 Drawing Sheets

(51) Int. Cl.
*G06T 5/00* (2006.01)
*G02B 27/00* (2006.01)
*H04N 5/357* (2011.01)

(56) References Cited

U.S. PATENT DOCUMENTS

| | | | | |
|---|---|---|---|---|
| 2005/0053307 | A1* | 3/2005 | Nose | G06T 3/0018 382/275 |
| 2005/0231616 | A1 | 10/2005 | Iwai et al. | |
| 2006/0274170 | A1* | 12/2006 | Azuma | H04N 5/23238 348/246 |
| 2007/0200937 | A1* | 8/2007 | Yoda | H04N 5/217 348/231.99 |
| 2009/0046179 | A1* | 2/2009 | Aoyama | G06T 3/0018 348/241 |
| 2009/0290198 | A1* | 11/2009 | Hamano | G02B 5/205 358/475 |
| 2009/0295981 | A1* | 12/2009 | Watanabe | G03B 13/32 348/345 |
| 2010/0097502 | A1* | 4/2010 | Hagiwara | G06T 5/006 348/241 |
| 2010/0157080 | A1 | 6/2010 | Kondo | |
| 2011/0043657 | A1* | 2/2011 | Hara | H04N 9/045 348/223.1 |
| 2011/0135216 | A1 | 6/2011 | Hatakeyama | |
| 2011/0234823 | A1* | 9/2011 | Terasawa | G06T 5/006 348/208.4 |
| 2014/0161357 | A1* | 6/2014 | Tsubaki | G06T 5/006 382/197 |
| 2015/0208051 | A1* | 7/2015 | Sugimoto | H04N 9/646 348/223.1 |

FOREIGN PATENT DOCUMENTS

| | | |
|---|---|---|
| CN | 102457752 A | 5/2012 |
| JP | H4-348343 A | 12/1992 |
| JP | H6-165024 A | 6/1994 |
| JP | H7-193790 A | 7/1995 |
| JP | 2000-4391 A | 1/2000 |
| JP | 2005-311473 A | 11/2005 |
| JP | 2011-123589 A | 6/2011 |
| JP | 2014-087022 A | 5/2014 |
| JP | 2014-093714 A | 5/2014 |
| JP | 2015-198380 A | 11/2015 |
| WO | 2009/078454 A1 | 6/2009 |

* cited by examiner

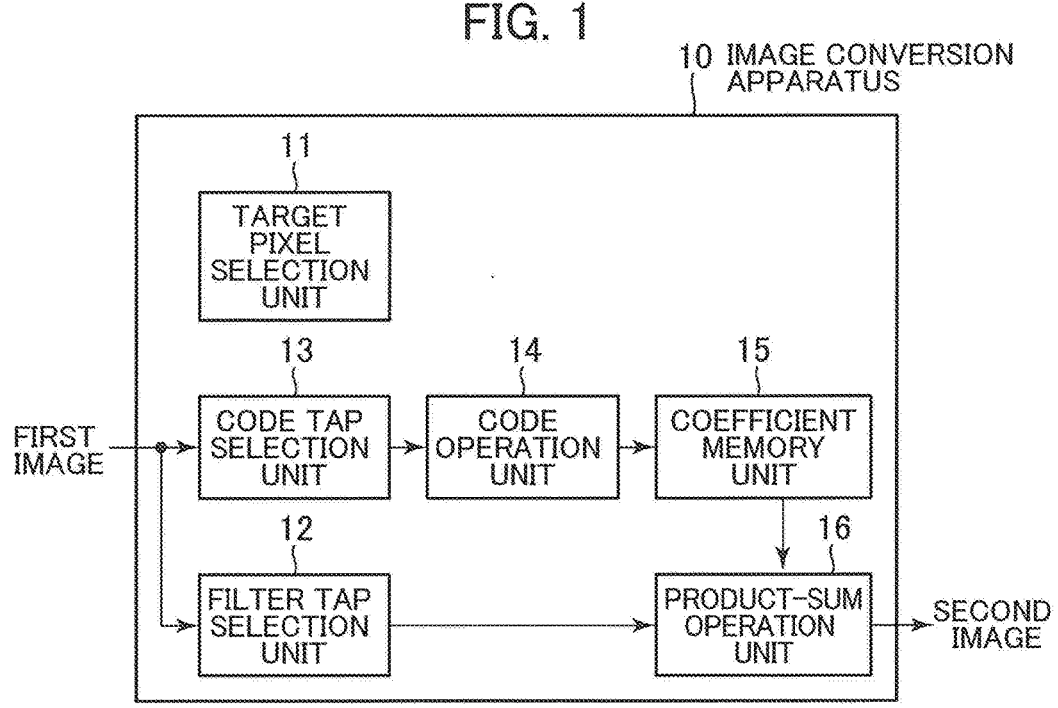
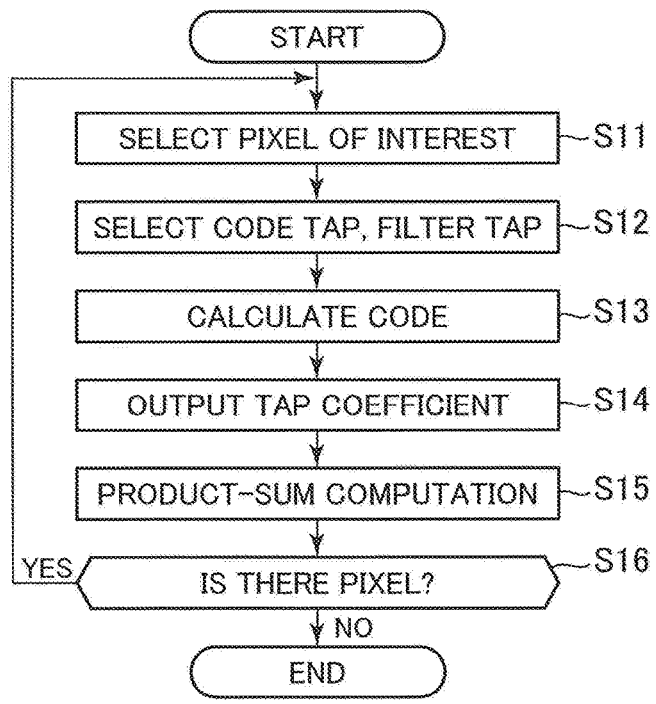

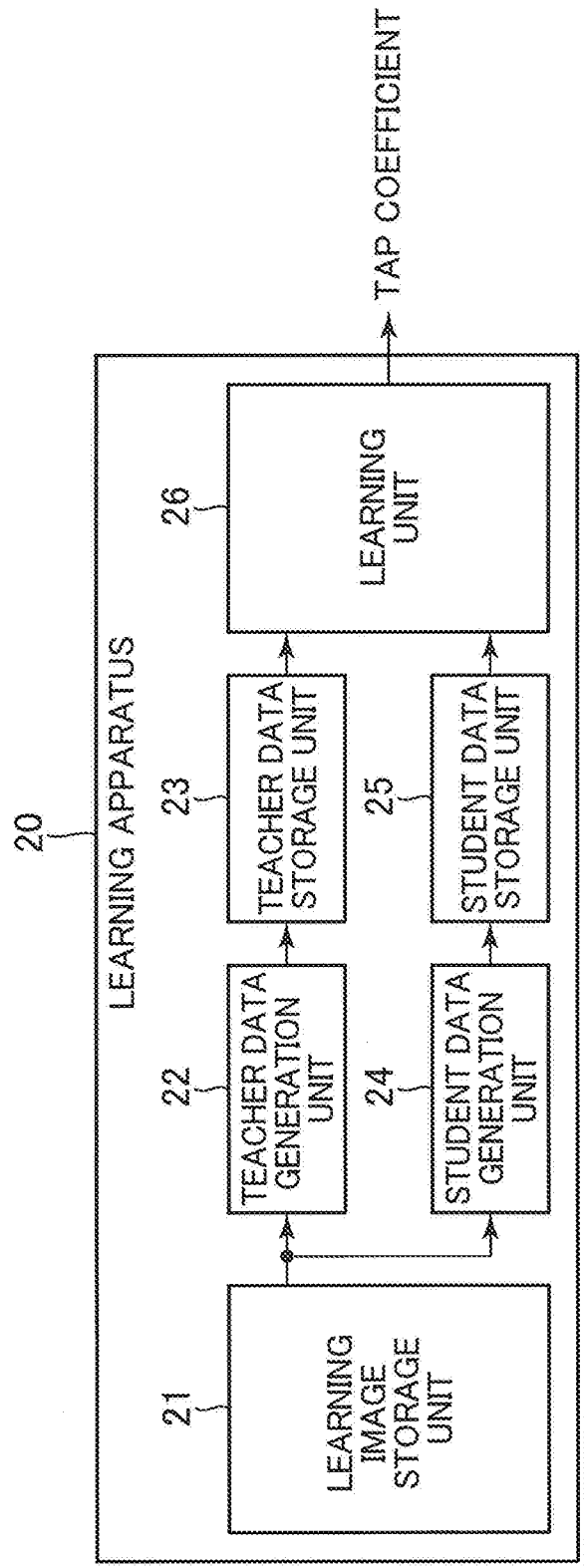

FIG. 22A
TAP COEFFICIENTS SUPPLIED TO PRODUCT-SUM COMPUTATION DEVICE
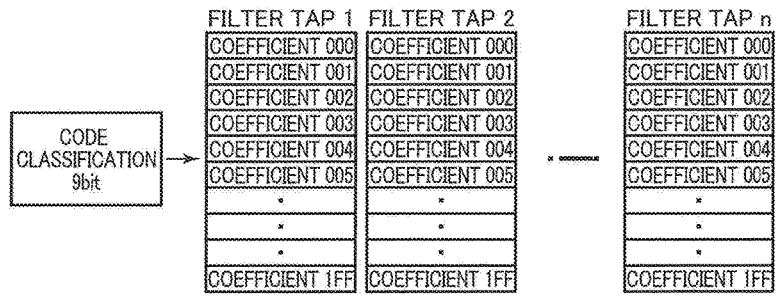
FIG. 22B
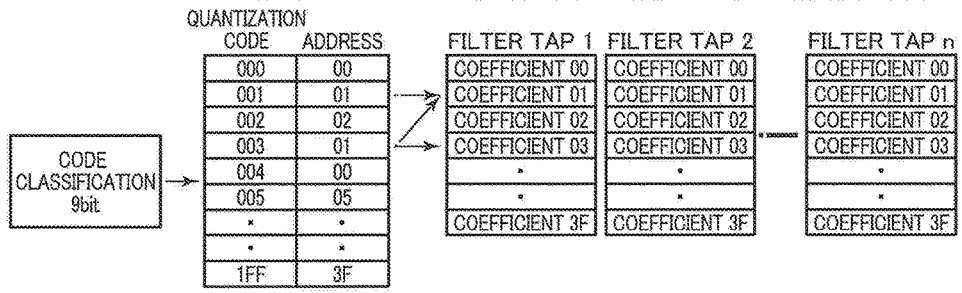
FIG. 22C
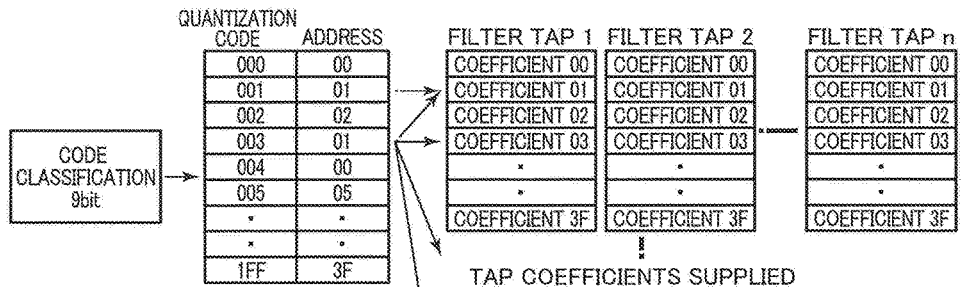
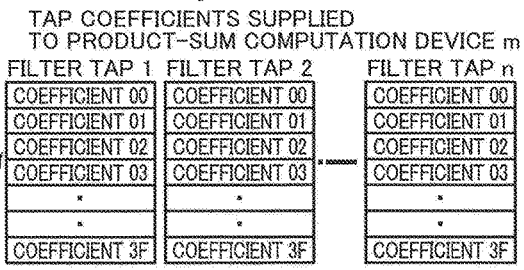

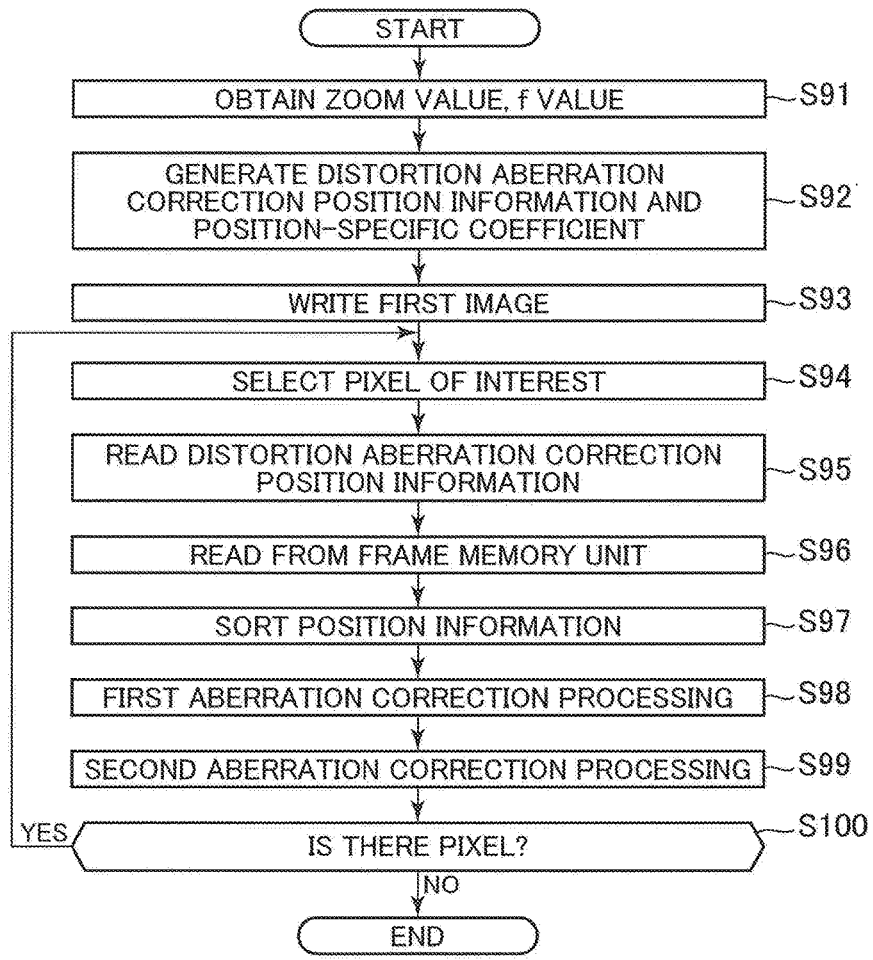
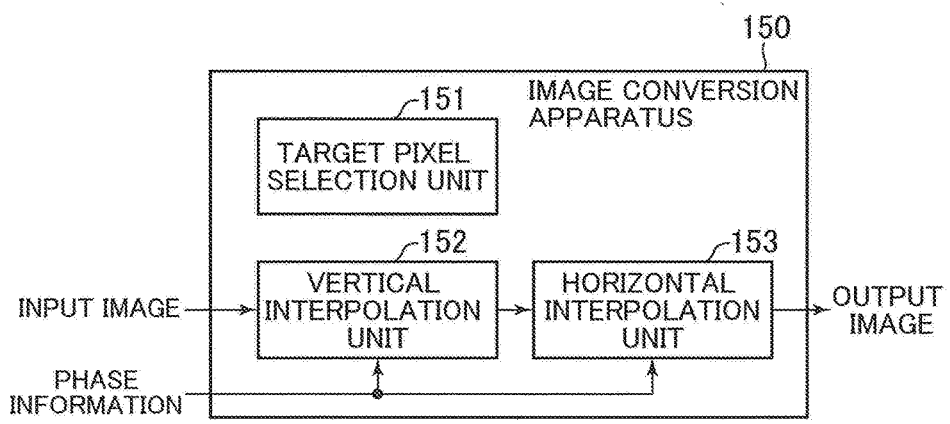

IMAGE PROCESSING APPARATUS, IMAGE PROCESSING METHOD, RECORDING MEDIUM, PROGRAM AND IMAGING-CAPTURING APPARATUS

TECHNICAL FIELD

The present invention relates to an image processing apparatus, an image processing method, a recording medium, a program, and an imaging-capturing apparatus.

BACKGROUND OF THE INVENTION

In recent years, for example, solid-state imaging-capturing apparatuses using a solid-state imaging-capturing device such as a CMOS (Complementary Metal Oxide Semiconductor) image sensor and a CCD (Charge Coupled Device) image sensor are widely used for the use of electronic cameras such as a video camera, an electronic still camera, a so-called smart phone, a security camera, an endoscope, a microscope, and the like.

In a solid-state imaging-capturing apparatus, light from a subject is incident on a solid-state imaging-capturing device via an imaging-capturing optical system, and therefore, deviation from the ideal imaging, i.e., aberration occurs. For this reason, there is a problem in that, in the output image of the solid-state imaging-capturing apparatus, the degree of deterioration of the image quality such as distortion, blurring, and darkening increases according to the distance from the image central portion.

To solve such a problem, Patent Literature 1 discloses a technique for correcting a distortion amount of an image using an approximate expression with an arbitrary image height as a reference from the center on the screen of the shooting lens based on the distortion aberration information of the shooting lens.

Patent Literature 2 discloses a technique for suppressing jaggies that can occur in image at the time of correction of distortion aberration.

Patent literature 3 discloses a technique for preventing deterioration in image quality when performing resolution conversion.

Patent Literature 4 and Patent Literature 5 disclose a technique for accurately obtaining a correction amount for correcting image distortion caused by lens aberration.

CITATION LIST

Patent Literature

Patent Literature 1: JP 4-348343 A
Patent Literature 2: JP 6-165024 A
Patent Literature 3: JP 2005-311473 A
Patent Literature 4: JP 7-193790 A
Patent Literature 5: JP 2000-4391 A

SUMMARY OF INVENTION

Technical Problem

The present invention solves the problems associated with the prior art.

Solution to Problem

According to a first aspect of the present invention, there is provided an image processing apparatus including: an image storage unit storing a first image affected by aberration of an optical system; a position information generation unit generating position information about a pixel of the first image corresponding to a scanned target pixel, every time the target pixel is scanned in a predetermined order on a second image, on the basis of position information about the target pixel scanned in the predetermined order for generating a pixel value of each pixel of the second image from which influence of the aberration is removed and a distortion aberration table indicating a corresponding relationship between position information about each pixel of the first image and position information about each pixel of the second image; a first aberration correction unit using fractional part information about the position information generated by the position information generation unit to correct phase shift caused by distortion aberration for each pixel of the first image read from the image storage unit; and a second aberration correction unit generating the second image by correcting aberration other than distortion aberration in the first image corrected by the first aberration correction unit.

According to a second aspect of the present invention, there is provided an image processing method including: a position information generation step of generating position information about a pixel of a first image corresponding to a scanned target pixel, every time the target pixel is scanned in a predetermined order on a second image, on the basis of position information about the target pixel scanned in the predetermined order for generating a pixel value of each pixel of the second image from which influence of aberration is removed and a distortion aberration table indicating a corresponding relationship between position information about each pixel of the first image and position information about each pixel of the second image; a first aberration correction step of using fractional part information about the position information generated by the position information generation step to correct phase shift caused by distortion aberration for each pixel of the first image read from the image storage unit storing the first image; and a second aberration correction step of generating the second image by correcting aberration other than distortion aberration in the first image corrected by the first aberration correction step.

According to a third aspect of the present invention, there is provided a recording medium recorded with a program for causing a computer to function as: an image storage unit storing a first image affected by aberration of an optical system; a position information generation unit generating position information about a pixel of the first image corresponding to a scanned target pixel, every time the target pixel is scanned in a predetermined order on a second image, on the basis of position information about the target pixel scanned in the predetermined order for generating a pixel value of each pixel of the second image from which influence of the aberration is removed and a distortion aberration table indicating a corresponding relationship between position information about each pixel of the first image and position information about each pixel of the second image; a first aberration correction unit using fractional part information about the position information generated by the position information generation unit to correct phase shift caused by distortion aberration for each pixel of the first image read from the image storage unit; and a second aberration correction unit generating the second image by correcting aberration other than distortion aberration in the first image corrected by the first aberration correction unit.

According to a fourth aspect of the present invention, there is provided an imaging-capturing apparatus including:

an imaging-capturing device generating a first image according to imaging-capturing light incident via an optical system; an image storage unit storing the first image generated by the imaging-capturing device; a position information generation unit generating position information about a pixel of the first image corresponding to a scanned target pixel, every time the target pixel is scanned in a predetermined order on a second image, on the basis of position information about the target pixel scanned in the predetermined order for generating a pixel value of each pixel of the second image from which influence of the aberration is removed and a distortion aberration table indicating a corresponding relationship between position information about each pixel of the first image and position information about each pixel of the second image; a first aberration correction unit using fractional part information about the position information generated by the position information generation unit to correct phase shift caused by distortion aberration for each pixel of the first image read from the image storage unit; and a second aberration correction unit generating the second image by correcting aberration other than distortion aberration in the first image corrected by the first aberration correction unit.

Advantageous Effects of Invention

The present invention can accurately correct an images of which image quality is degraded by being affected by art optical system.

BRIEF DESCRIPTION OF DRAWINGS

FIG. 1 is a block diagram illustrating a configuration example of an image conversion apparatus that performs image conversion processing with a code classification type adaptive filter.

FIG. 2 is a flowchart explaining image conversion processing with an image conversion apparatus.

FIG. 3 is a block diagram illustrating a configuration example of the learning apparatus.

FIG. 22A is a figure illustrating a relationship between quantization codes and tap coefficients classified into 9 bits.

FIG. 22B is a figure illustrating a relationship between quantization codes, a conversion table, and tap coefficients classified into 9 bits.

FIG. 22C is a figure illustrating a relationship between quantization codes, a common conversion table, and tap coefficients classified into 9 bits.

FIG. 30 is a flowchart explaining an example of image conversion processing with the image conversion apparatus.

FIG. 31 is a block diagram showing another configuration example of an image conversion apparatus for performing minute aberration correction with the first aberration correction processing unit.

DETAILED DESCRIPTION OF THE INVENTION

Figure 4:
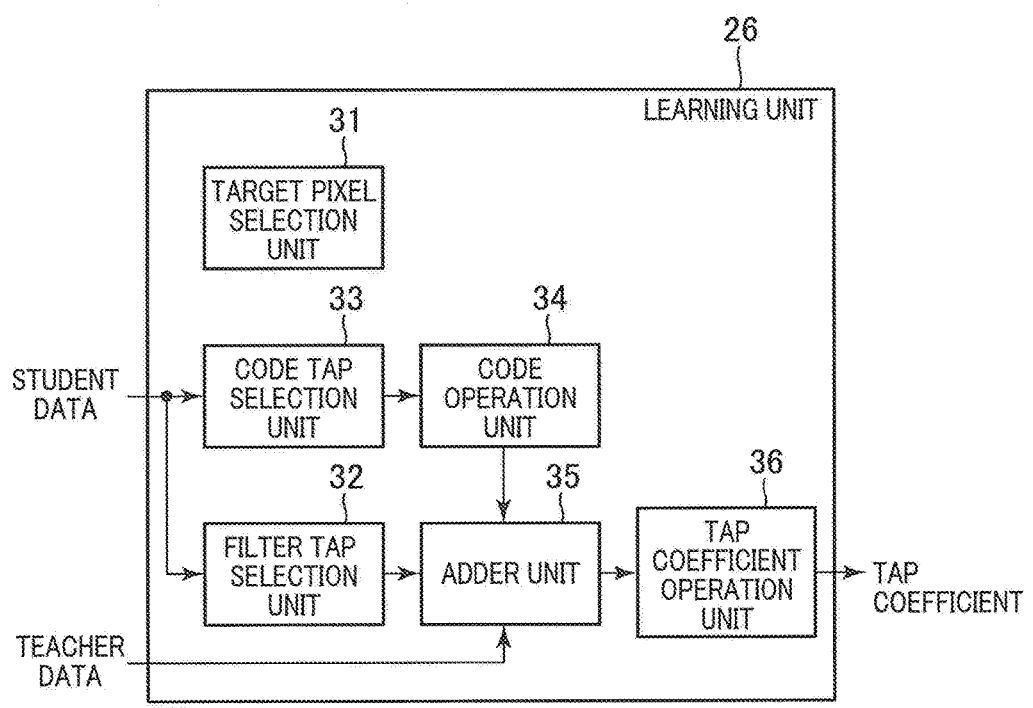
FIG. 4 is a block diagram illustrating a configuration example of a learning unit.

Hereinafter, an embodiment of the present invention will be described. First, a code classification type adaptive filter will be explained.

[Code Classification Type Adaptive Filter]

The code classification type adaptive filter is image conversion processing which converts a first image to a second image, and performs various signal processing according to the definition of first and second images.

For example, if the first image is a low resolution image and the second image is a high resolution image, the code classification type adaptive filter performs super resolution processing to improve the resolution.

If the first image is a low S/N (Signal/Noise) image and the second image is a high S/N image, the code classification type adaptive filter performs noise removal processing.

If the second image has more or fewer pixels than the first image, the code classification type adaptive filter performs image resize (enlargement or reduction) processing.

If the first image is an image blurred by a Gaussian model or the like and the second image is not blurred, the code classification type adaptive filter performs blur removal processing.

If the first image is an image obtained by shifting the phase and the second image is an image in which the phase is not shifted, the code classification type adaptive filter performs phase shift processing.

The code classification type adaptive filter calculates the pixel value of the target pixel by using the tap coefficient of the code and the pixel value of the pixel of the first image selected for the target pixel of interest in the second image. The tap number of the code can be obtained by classifying the pixel value of target pixel of the second image into any one of multiple codes.

FIG. 1 is a block diagram showing a configuration example of an image conversion apparatus 10 which performs image conversion processing with a code classification type adaptive filter.

The first image is supplied to the image conversion apparatus 10. The first image is supplied to a code tap selection unit 12 and a filter tap selection unit 13.

The target pixel selection unit 11 sequentially selects each pixel constituting the second image as a target pixel and supplies information indicating the selected target pixel to a predetermined block.

The filter tap selection unit 12 selects pixel values of a plurality of pixels constituting the first image as a filter tap in order to obtain the pixel value of the target pixel by filter computation. More specifically, the filter tap selection unit 12 selects pixel values of multiple pixels of the first image at positions close to the position of the target pixel as filter taps, and supplies the selected filter taps to a product-sum operation unit 16.

The code tap selection unit 13 selects, as code taps, pixel values of a plurality of pixels constituting the first image at positions close to the position of the target pixel in order to classify the target pixel into one of several codes and supplies the selected code taps to the code operation unit 14.

The tap structures of the filter tap and the code tap (structures of selected pixels) may be the same tap structure or different tap structures.

Based on the code tap from the code tap selection unit 13, the code operation unit 14 classifies the target pixel by code in accordance with a predetermined rule and supplies the code corresponding to the code of the target pixel to a coefficient memory unit 15.

The method of classifying the code includes, for example, a DR (Dynamic Range) quantization method quantizing the pixel value as a code tap. The DR quantization method quantizes the pixel value of the pixel constituting the code tap and determines the code of the target pixel according to the DR quantization code obtained a result.

In the N-bit DR quantization method, for example, the maximum value MAX and the minimum value MIN of the pixel values of the pixels constituting the code tap are first detected, for example. Next, the dynamic range DR (=maximum value MAX−min minimum value MIN) is set to the local dynamic range of the set of pixels constituting the code tap. Based on this dynamic range DR, the pixel value of each pixel constituting the code tap is quantized to N-bit.

More specifically, the minimum value MIN is subtracted from the pixel value of each pixel constituting the code tap, and the subtraction value is divided (quantized) by $DR/2^N$.

The pixel value of N bit pixels forming the code tap as described above are arranged in a predetermined order, and the arranged bit strings are output as the DR quantization code.

For example, if the code tap is processed in 1-bit DR quantization processing, the pixel value of each pixel making up that code tap is divided by the average value of the maximum value MAX and the minimum value MIN (integer computation). As a result, the pixel value of each pixel becomes 1 bit (binarization). A bit string in which the 1-bit pixel values are arranged in a predetermined order is output as a DR quantization code. When code classification is performed only with the DR quantization, for example, the DR quantization code is a code which is computed by the code operation unit 14.

It should be noted that, for example, the code operation unit 14 can output the pattern of the level distribution of the pixel values of the pixels constituting the code tap as the class code without any change. Here, in the case where the code tap is composed of pixel valises of M pixel and A bit is assigned to the pixel value of each pixel, the number of codes output by the code operation unit 14 is $(2^M)^A$. In other words, the number of codes becomes an enormous number exponentially proportional to the bit number A of the pixel value of the pixel. Therefore, the code operation unit 14 preferably performs code classification by compressing the information amount of the code tap by the aforementioned DR quantization, vector quantization, or the like.

The coefficient memory unit 15 memorizes a tap coefficient for each code obtained through learning which will be described later. When the code is supplied from the code operation unit 14, the coefficient memory unit 15 outputs the tap coefficient stored at the address corresponding to the code and supplies the tap coefficient to the product-sum operation unit 16. Here, the tap coefficient is a coefficient by which the input data is multiplied in the so-called tap in the digital filter.

The product-sum operation unit 16 uses a filter tap output from the filter tap selection unit 12 and a tap coefficient Output from the coefficient memory unit 15 to perform product-sum computation in order to derive a prediction value of the pixel value of the target pixel. In other words, the product-sum operation unit 16 obtains the pixel value of the target pixel, i.e., the pixel value of the pixel constituting the second image.

FIG. 2 is a flowchart explaining image conversion processing with the image conversion apparatus 10.

In step S11, the target pixel selection unit 11 selects one of pixels that has not yet selected as a pixel of interest (that has not yet converted in the conversion processing) from among the pixels constituting the second image for the first image input to the image conversion apparatus 10. For example, the target pixel selection unit 11 selects the target pixel from pixels which have not yet been selected as a pixel of interest in the raster scan order for each pixel constituting the second image. Then, stop S12 is subsequently performed.

In step S12, the code tap selection unit 12 selects pixels constituting the code tap for the target pixel from each pixel of the first image input to the image conversion apparatus 10, and supplies the selected code tap to the code operation unit 14. The filter tap selection unit 13 selects pixels constituting the filter tap for the target pixel from each pixel of the first image input to the image conversion apparatus 10 and supplies the selected filter tap to the product-sum operation unit 16. Then, step S13 is subsequently performed.

In step S13, the code operation unit 14 code computes the target pixel on the basis of the code tap for the target pixel supplied to the code tap selection unit 12. Further, the code operation unit 14 supplies the code of the target pixel obtained as a result of the code computation to the coefficient memory unit 15. Then, step S14 is subsequently performed.

In step S14, the coefficient memory unit 15 acquires and outputs the tap coefficient memorized, at the address corresponding to the code supplied from the code operation unit 14. The product-sum operation unit 16 obtains the tap coefficient output from the coefficient memory unit 15. Then, step S15 is subsequently performed.

In step S15, the product-sum operation unit 16 performs predetermined product-sum computation using the filter tap output from the filter tap selection unit 12 and the tap coefficient acquired from the coefficient memory unit 15, thereby obtaining the pixel value of the target pixel. Then, step S16 is subsequently performed.

In step S16, the target pixel selection unit 11 determines whether or not each pixel of the second image includes a pixel that has not yet been selected as a target pixel. In the case of a positive determination result, i.e., in the case where there is a pixel not selected as the target pixel, step S11 is executed again to perform the processing in step S11 and subsequent steps. In the case of a negative determination result, i.e., in the case where there is no pixel that has not yet selected as the target pixel, the pixel values have been obtained for all the pixels of the second image, and therefore the processing is terminated.

<How to Derive Tap Coefficient>

Next, the product-sum computation of the product-sum operation unit 16 and learning of the tap coefficient memorized in the coefficient memory unit 15 will be described. Here, it is assumed that the second image is a high image quality image, and the first image is a low image quality image of which image quality (resolution) is lowered with LPF (Low Pass Filter) processing applied to the high image quality image.

The product-sum operation unit 16 performs, for example, a linear primary prediction computation. At this time, the pixel value y of the high image quality image is obtained by the linear expression of the following expression (1).

[Mathematical Formula 1]

$$y = \sum_{n=1}^{N} w_n x_n \quad (1)$$

In Expression (1), $x_n$ represents the pixel value of the pixel (low image quality pixel) of the n-th low image quality image constituting the filter tap for a pixel y of the high image quality image. $w_n$ represents the n-th tap coefficient by which the pixel value $x_n$ of the n-th low-image quality pixel is multiplied. In Expression (1), the filter tap is composed of N low image quality pixels $x_1, x_2, \ldots, x_n$.

Here, the pixel value y of the high image quality pixel is obtained not only by the linear equation shown in Expression (1) but also by a higher degree expression of degree two or higher. The true value of the pixel value of the k-th sample (k-th) high image quality pixel is denoted as $y_k$, and the predicted value of the true value $y_k$ obtained by Expression (1) is denoted as $y_k'$. A prediction error $e_k$ for the true value $y_k$ of the predicted value $y_k'$ is expressed by Expression (2).

[Mathematical Formula 2]

$$e_k = y_k - y_k' \quad (2)$$

The predicted value $y_k'$ of Expression (2) is obtained according to Expression (1). Expression (3) is obtained by replacing $y_k'$ of Expression (2) according to Expression (1).

[Mathematical Formula 3]

$$e_k = y_k - \left(\sum_{n=1}^{N} w_n x_{n,k}\right) \quad (3)$$

In Expression (3), $x_{n,k}$ represent the n-th low image quality pixel constituting the filter tap for the high image quality pixel $y_k$ of the k-th sample.

The tap coefficient $w_n$ that sees the prediction error $e_k$ of Expression (3) (or Expression (2)) to 0 is the optimum tap coefficient for prediction of the high image quality pixel $y_k$. However, it is generally difficult to find the optimum tap coefficient $w_n$ for all the high image quality pixels $y_k$.

Therefore, for example, the least squares method is adopted as a criterion indicating that the tap coefficient $w_n$ is an optimum value. In this case, the optimum tap coefficient $w_n$ is obtained, by minimizing the sum E of the squared error expressed by Expression (4).

[Mathematical Formula 4]

$$E = \sum_{k=1}^{K} e_k^2 \quad (4)$$

In Expression (4), K expresses the number of sample (the number of samples for learning) in which a set is formed by the high image quality pixel $y_k$ and the low image quality pixels $x_{1,k}, x_{2,k}, \ldots, x_{n,k}$ constituting the filter tap for that high image quality pixel $y_k$.

The minimum value (minimum value) of the sum E of the squared error of Expression (4) is obtained by $w_n$ with which the result of partial differentiation of the sum E with the tap coefficient $w_n$ is made to be zero as shown in Expression (5).

[Mathematical Formula 5]

$$\frac{\partial E}{\partial w_n} = e_1 \frac{\partial e_1}{\partial w_n} + e_2 \frac{\partial e_2}{\partial w_n} + \ldots + e_k \frac{\partial e_k}{\partial w_n} = 0 \quad (5)$$

$$(n = 1, 2, \ldots, N)$$

Therefore, Expression (3) can be partially differentiated with tap coefficient $w_n$ to obtain Expression (6).

[Mathematical Formula 6]

$$\frac{\partial e_k}{\partial w_1} = -x_{1,k}, \frac{\partial e_k}{\partial w_2} = -x_{2,k}, \ldots, \frac{\partial e_k}{\partial w_N} = -x_{N,k} \quad (6)$$
$$(k = 1, 2, \ldots, K)$$

Expression (7) is obtained from Expressions (5) and (6).

[Mathematical Formula 7]

$$\sum_{k=1}^{K} e_k x_{1,k} = 0, \sum_{k=1}^{K} e_k x_{2,k} = 0, \ldots, \sum_{k=1}^{K} e_k x_{N,k} = 0, \quad (7)$$

When Expression (3) is substituted into $e_k$ of Expression (7), Expression (7) is represented by the normal equation shown in Expression (8).

[Mathematical Formula 8]

$$\begin{bmatrix} \left(\sum_{k=1}^{K} x_{1,k} x_{1,k}\right) & \left(\sum_{k=1}^{K} x_{1,k} x_{2,k}\right) & \cdots & \left(\sum_{k=1}^{K} x_{1,k} x_{N,k}\right) \\ \left(\sum_{k=1}^{K} x_{2,k} x_{1,k}\right) & \left(\sum_{k=1}^{K} x_{2,k} x_{2,k}\right) & \cdots & \left(\sum_{k=1}^{K} x_{2,k} x_{N,k}\right) \\ \vdots & \vdots & & \vdots \\ \left(\sum_{k=1}^{K} x_{N,k} x_{1,k}\right) & \left(\sum_{k=1}^{K} x_{N,k} x_{2,k}\right) & \cdots & \left(\sum_{k=1}^{K} x_{N,k} x_{N,k}\right) \end{bmatrix} \begin{bmatrix} w_1 \\ w_2 \\ \vdots \\ w_N \end{bmatrix} = \begin{bmatrix} \left(\sum_{k=1}^{K} x_{1,k} y_k\right) \\ \left(\sum_{k=1}^{K} x_{2,k} y_k\right) \\ \vdots \\ \left(\sum_{k=1}^{K} x_{N,k} y_k\right) \end{bmatrix} \quad (8)$$

The tap coefficient $w_n$ is derived, for example, by using a sweeping method (Gauss-Jordan's elimination method) or the like with the normal equation of Expression (8). By solving the normal equation of Expression (8) for each code, the optimum tap coefficient (tap coefficient that minimizes the sum E of the squared errors) $w_n$ is found for each code.

FIG. 3 is a block diagram showing a configuration example of a learning apparatus for learning to derive a tap coefficient $w_n$ by solving the normal equation of Expression (8) for each code.

The learning image storage unit 21 of the learning apparatus 20 stores the learning image used for the learning of the tap coefficient $w_n$. The learning image is, for example, a high image quality image with a high resolution.

The teacher data generation unit 22 reads the learning image from the learning image storage unit 21. The teacher data generation unit 22 generates, from the learning image, teacher data (teacher image) which is the supervisor (true value) of learning of the tap coefficient, i.e., the pixel values of the mapping destination of mapping as prediction computation with Expression (1), and supplies it to teacher data storage unit 23. The teacher data generation unit 22 may supply the high image quality image, which is the learning image, as the teacher data to the teacher data storage unit 23 as it is.

The teacher data storage unit 23 stores the high image quality image supplied from the teacher data generation unit 22 as teacher data.

The student data generation unit 24 reads the learning image from the learning image storage unit 21. The student data generation unit 24 generates, from the learning image, student data (student image) which is the student of learning of the tap coefficient, i.e., the pixel values of the conversion destination of mapping as prediction computation with Expression (1), and supplies it to the student data storage unit 25.

For example, the student data generation unit 24 filters the high image quality image as a learning image, generates a low image quality image with reduced resolution, and supplies this low image quality image as student data to the student data storage unit 25.

The student data storage unit 25 stores the low image quality image supplied from the student data generation unit 24 as the student data.

The learning unit 26 sequentially selects each pixel of the high image quality image stored in the teacher data storage unit 23 as a target pixel. The learning unit 26 selects, as the filter tap corresponding to the selected target pixel, a low image quality pixel of the same tap structure as the one selected by the filter tap selection unit 12 of FIG. 1 from the low image qualify pixels constituting the low image quality image stored in student data storage unit 25.

Further, the learning unit 26 formulates and solves the normal equation of the Expression (8) for each code using each pixel constituting teacher data and the filter tap selected when the pixel is the target pixel, thus deriving the tap coefficient for each code.

FIG. 4 is a block diagram illustrating a configuration example of the learning unit 26.

The target pixel selection unit 31 sequentially selects the pixel constituting the teacher data stored in the teacher data storage unit 23 as a target pixel and supplies the information representing the target pixel to a predetermined block.

The filter tap selection unit 32 selects, as the filter tap corresponding to the target pixel, the same pixel as the one selected by the filter tap selection unit 12 of FIG. 1 from the low image quality pixels constituting the low image quality image stored in the student data storage unit 25. As a result, the filter tap of the same tap structure as that obtained by filter tap selection unit 12 can be obtained. The filter tap is supplied to an adder unit 35.

The code tap selection unit 33 selects, as code taps corresponding to the target pixel, the same pixels as those selected by the code tap selection unit 13 in FIG. 1 from the low image quality pixels constituting the low image quality image stored in the student data storage unit 25. The code taps of the same tap structure as those obtained by the code tap selection unit 13 can be obtained. The code taps are supplied to a code operation unit 34.

Based on the code tap output from the code tap selection unit 33, the code operation unit 34 performs the same code computation as the code operation unit 14 of FIG. 1, and supplies the resulting code to the adder unit 35.

The adder unit 35 reads the teacher data (pixel), which is a target pixel, from the teacher data storage unit 23. For each code supplied from the code operation unit 34, the adder unit 35 performs adding of the target pixel read from the teacher data storage unit 23 and the student data (pixel) constituting the filter tap for the target pixel supplied from the filter tap selection unit 32.

In this case, the teacher data $y_k$ read from the teacher data storage unit 23, the filter tap $x_{n,k}$ selected by the filter tap selection unit 32, and the code computed by the code operation unit 34 are supplied to the adder unit 35.

For each code supplied from the code operation unit 34, the adder unit 35 uses the filter tap (student data) $x_{n,k}$ to perform computation corresponding to multiplication of the student data $(x_{n,k} \cdot x_{n',k})$ and the summation ($\Sigma$) in the matrix of the left-hand side of Expression (8).

Further, for each code supplied from the code operation unit 34, the adder unit 35 uses the filter tap (student data) $x_{n,k}$ and the teacher data $y_k$ to perform computation corresponding to multiplication of the student data $x_{n,k}$ and the teacher data $y_k$ ($x_{n,k} \cdot y_k$) and the summation ($\Sigma$) in the vector of the right-hand side of Expression (8).

More specifically, the adder unit 35 stores, in a storage unit provided therein (not shown), a component $(\Sigma x_{n,k} \cdot x_{n',k})$ of the matrix at the left-hand side of Expression (8) derived for the teacher data adopted as the target pixel in the previous time and the component $(\Sigma x_{n,k} \cdot y_k)$ of the vector at the right-hand side. For the matrix component $(\Sigma x_{n,k} \cdot x_{n',k})$ or the vector component $(\Sigma x_{n,k} \cdot y_k)$, the adder unit 35 performs adding (adding represented by summation in Expression (8)) of each of the corresponding component $x_{n,k+1} \cdot x_{n',k+1}$ or $x_{n,k+1} \cdot y_{k+1}$ calculated using the teacher data $y_{k+1}$ and the student data $x_{n,k+1}$ for the teacher data newly adopted as the target pixel.

Then, the adder unit 35 adopts all the teacher data stored in the teacher data storage unit 23 as the target pixel and performs the above-mentioned addition to formulate the normal equation shown in Expression (8) for each code, and supplies the normal equation to the tap coefficient operation unit 36.

The tap coefficient operation unit 36 obtains an optimum tap coefficient $w_n$ for each code by solving the normal equation for each code supplied from the adder unit 35.

The coefficient memory unit 15 in the image conversion apparatus 10 of FIG. 1 memorizes the tap coefficient $w_n$ for each code derived as described above.

Figure 5:
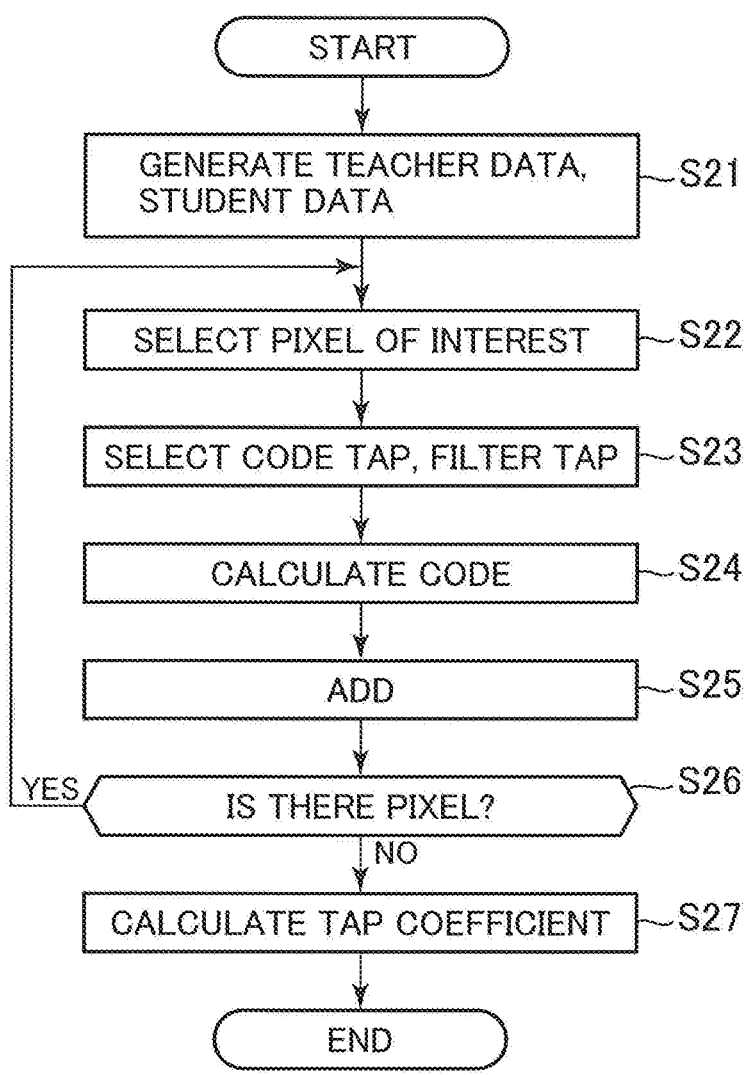
FIG. 5 is a flowchart explaining processing (learning processing) with the learning apparatus.

FIG. 5 is a flowchart explaining the learning processing of the learning apparatus 20 in FIG. 3.

In step S21, the teacher data generation unit 22 generates teacher data from the learning image stored in the learning image storage unit 21 and supplies the generated teacher data to the teacher data storage unit 23. The student data generation unit 24 generates student data from the learning image stored in the learning image storage unit 21 and supplies the generated student data to the student data storage unit 25. Then, step S22 is subsequently performed. The optimal learning image as teacher data or student data is selected according to what kind of image conversion processing the code classification type adaptive filter performs.

In step S22, the target pixel selection unit 31 of the learning unit 26 shown in FIG. 4 selects, as target pixels, pixels that are not adopted as the target pixels yet from the teacher data stored in the teacher data storage unit 23 shown in FIG. 3. Then, step S23 is subsequently performed.

In step S23, with regard to the target pixel, the filter tap selection unit 32 shown in FIG. 4 selects pixels as student data to be adopted as the filter tap from the student data stored in the student data storage unit 25 shown in FIG. 3, and supplies it to the adder unit 35.

With regard to the target pixel, the code tap selection unit 33 shown in FIG. 4 selects student data, to be adopted as a code tap from the student data stored in the student data storage unit 25 shown in FIG. 3 and supplies it to the code operation unit 34. Then, step S24 is subsequently performed.

In step S24, the code operation unit 34 performs code computation of the target, pixel based on the code tap for the target, pixel and supplies the result code to the adder unit 35. Then, step S25 is subsequently performed.

In step S25, the adder unit 35 reads the target pixel from the teacher data storage unit 23. For each code supplied from the code operation unit 34, the adder unit 35 performs adding of Expression (8) to add the read target pixel and the student data constituting the filter tap selected for the target pixel supplied from the filter tap selection unit 32. Then, step S26 is subsequently performed.

In step S26, the target pixel selection unit 31 determines whether or not the teacher data stored in the teacher data storage unit 23 includes a pixel that has not yet been selected as a target pixel. In the case of a positive determination result, i.e., in the case where the teacher data includes a pixel not selected as the target pixel, step S22 is performed again to execute the processing in step S22 and subsequent steps.

In the case of a negative determination result, i.e., in the case where the teacher data does not include a pixel not selected as the target pixel, the adder unit 35 supplies, to the tap coefficient operation unit 36, the matrix at the left-hand side and the vector at the right-hand side of Expression (8) for each code obtained from the processing in steps S22 to S26. Then, step S27 is subsequently performed.

In step S27, the tap coefficient operation unit 36 calculates the tap coefficient $w_n$ for each cede in accordance with the normal equation for each code constituted by the matrix at the left-hand side and the vector at the right-hand side of Expression (8) for each code supplied from the adder unit 35. Then, a series of processing is terminated.

Depending on code and the like, the number of normal equations required to obtain the tap coefficient $w_n$ may not be obtained because the number of learning images is insufficient. For such code, the tap coefficient operation unit 36 may output, for example, a preset tap coefficient.

[First Embodiment]

Figure 6:
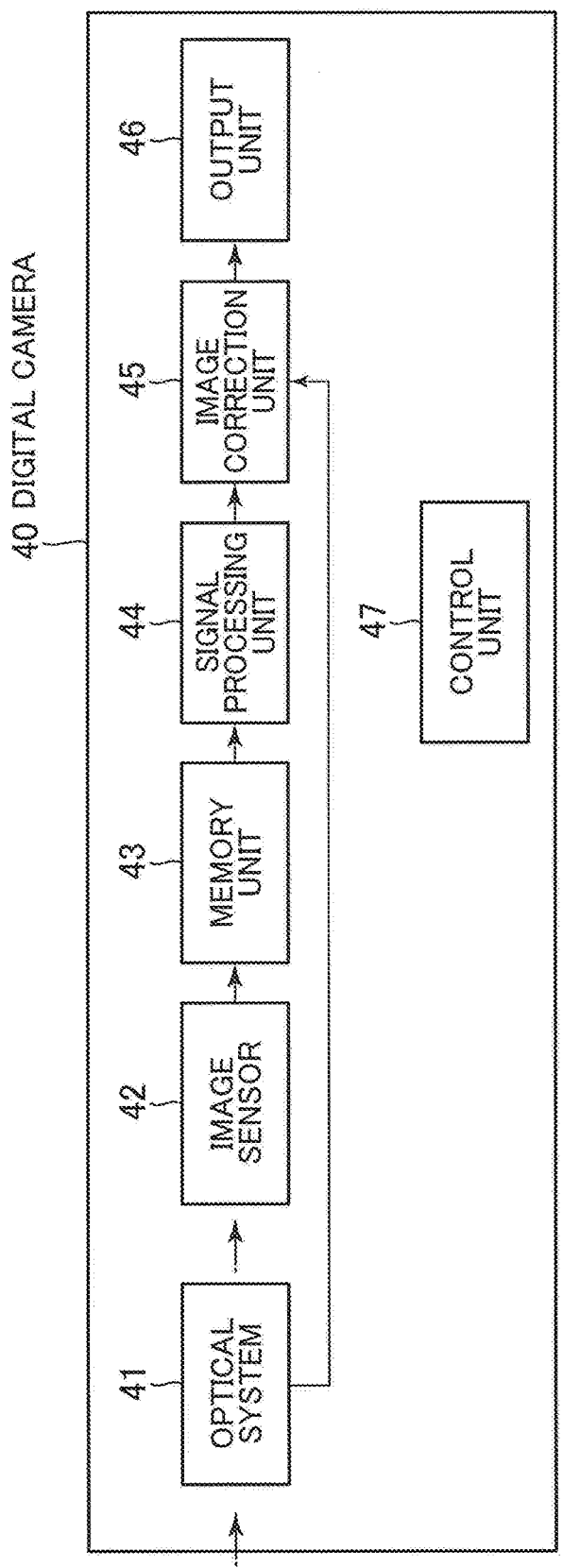
FIG. 6 is a block diagram illustrating a configuration example according to an embodiment of a digital camera to which the present technique is applied.

FIG. 6 is a block diagram showing a configuration example of a digital camera 40 according to the first embodiment of the present invention. The digital camera 40 shoots still images or moving images without aberration using the design information about the optical system.

The digital camera 40 includes an optical system 41, an image sensor 42, a memory unit 43, a signal processing unit 44, an image correction unit 45, an output unit 46, and a control unit 47.

The optical system 41 has, for example, a zoom lens (not shown), a focus lens, a diaphragm, an optical low pass filter, and the like. The optical system 41 causes external light to be incident upon the image sensor 42. The optical system 41 supplies shooting information such as zoom information about a zoom lens (not shown) and iris diaphragm information to the image correction unit 45.

The image sensor 42 is, for example, a CMOS image sensor. The image sensor 42 receives incident light from the optical system 41, performs photoelectric conversion, and outputs an image as an electric signal corresponding to incident light from the optical system 41.

The memory unit 43 temporarily memorizes the image output by the image sensor 42.

The signal processing unit 44 performs signal processing such as white balance processing, demosaic processing, gamma correction processing, noise elimination processing, and the like on the image memorized in the memory unit 43, and supplies the image processed in the signal processing to the image correction unit 45.

The image correction unit 45 performs image correction, processing such as aberration correction on the image supplied from the signal processing unit 44 using the shooting information supplied from the optical system 41.

The output unit 46 corresponds no, for example, (a) a display composed of a liquid crystal or the like, (b) a driver for driving a recording medium such as a semiconductor memory, a magnetic disk, an optical disk, or the like, (c) a communication device using a communication path such as a network, and outputs the image from the image correction unit 45 in various manners.

For example, when the output unit 46 is a display, the image from the image correction unit 45 is displayed as a so-called through image. When the output unit 46 is a driver for driving the recording medium, the image from the image correction unit 45 is recorded in the recording medium. When the output unit 46 is a communication device, the output unit 46 outputs the image from the image correction unit 45 to the outside via a communication path such as a network.

The control unit 47 controls each block constituting the digital camera 40 according to a user operation or the like.

In the digital camera 40 configured as described above, the image sensor 42 receives the incident light from the optical system 41, and outputs image in accordance with the incident light.

The image output by the image sensor 42 is supplied to the memory unit 43 and memorized. The image memorized in the memory unit 43 is processed in the signal processing by the signal processing unit 44 and the image correction unit 45. The image corrected in the image correction by the image correction unit 45 is output to the outside via the output unit 46.

<Configuration Example of Image Conversion Apparatus 50 Constituting Image Correction Unit 45>

Figure 7:
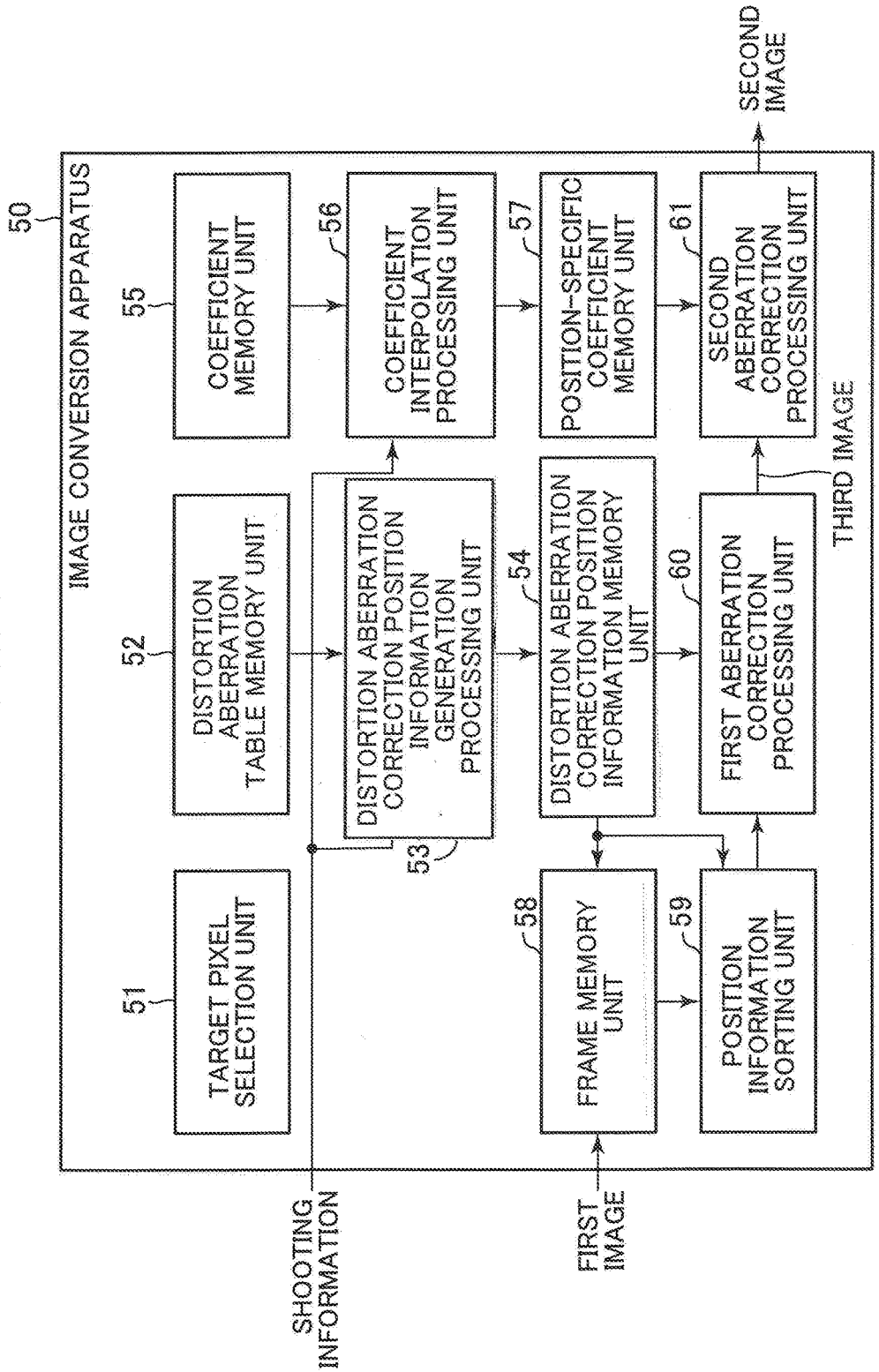
FIG. 7 is a block diagram illustrating a configuration example of an image conversion apparatus tor performing aberration correction processing performed by an image correction unit.

FIG. 7 is block diagram showing the configuration example of the image conversion apparatus 50 which performs aberration correction processing performed by the image correction unit 45 in FIG. 6.

The image correction unit 45 has, for example, a plurality of image conversion apparatuses 50 provided for each color component of RGB. For each Color component of RGB, the image conversion apparatus 50 performs aberration correction processing of an image by using the table and the coefficient corresponding to each color component.

The image conversion apparatus 50 obtains the corresponding relationship between the ideal first image having no aberration and the second image having aberration obtained via the optical system 41 using the result of two-dimensional image simulation of optical simulation. Then, the image conversion apparatus 50 performs aberration correction on the second image by the table for correcting the distortion aberration and the coefficient obtained through learning processing of the above-mentioned code classification type adaptive filter.

The corresponding relationship between ideal first image (x, y) having no distortion aberration and the second image (x', y') having distortion aberration obtained via the optical system 41 will be explained.

"Distortion aberration" means that an image stretches and shrinks in the radial direction from the center of the image, and image distortion occurs. However, the center of the image is the intersection of the optical axis of the imaging-capturing optical system, and the imaging-capturing plane of the image sensor.

Figure 8A:
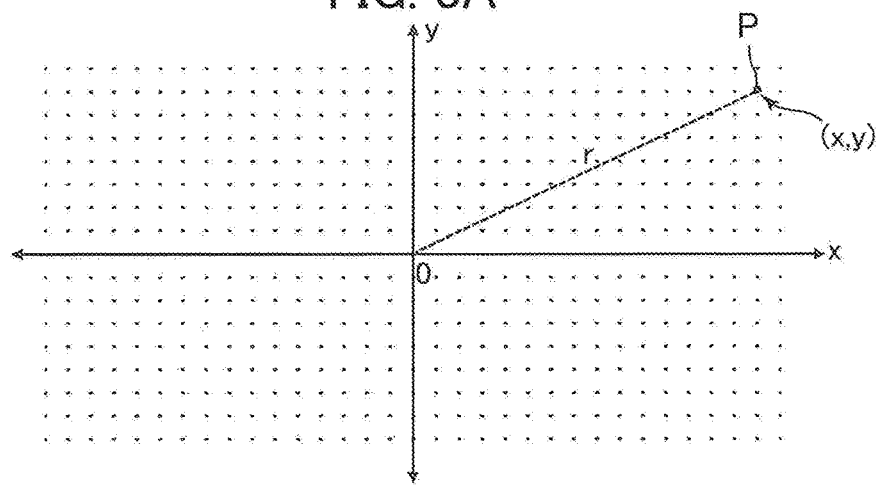
FIG. 8A is a conceptual diagram showing properties of distortion aberration with an imaging-capturing apparatus.
Figure 8B:
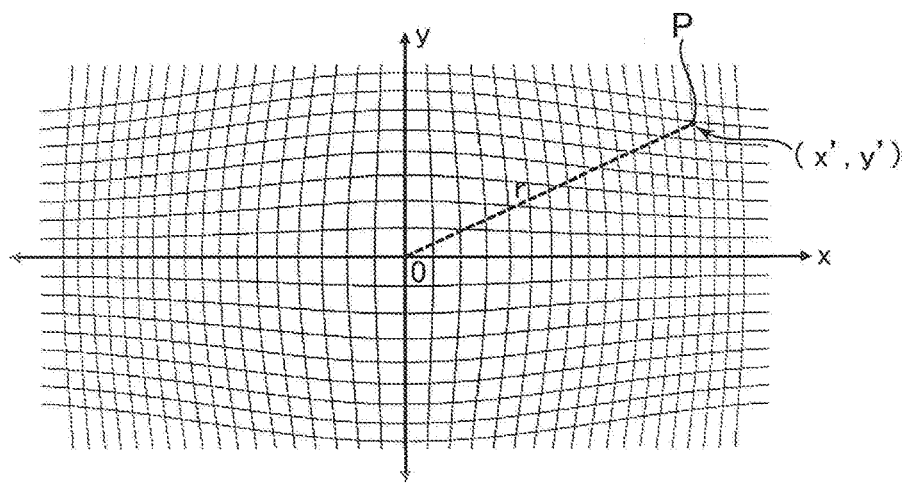
FIG. 8B is a conceptual diagram showing properties of distortion aberration with the imaging-capturing apparatus.

For example, a point P on the first image shown in FIG. 8A stretches in the radial direction and corresponds to a point P' on the second image shown in FIG. 8B. The degree of distortion depends on the distance r from the center of image. The distortion aberration in the ideal imaging-capturing optical system is point symmetric with respect to the center of the image. The corresponding relationship between an image having no distortion aberration and an image having distortion aberration is as shown in Expressions (9) to (11) below.

[Mathematical Formula 9]

$$r^2 = x^2 + y^2 \quad (9)$$

$$r'^2 = x'^2 + y'^2 \quad (10)$$

$$x:y = x':y' \quad (11)$$

According to Expressions (9) to (11), If there is a function or table showing the corresponding relationship between distance r and distance r', a corresponding relationship between an ideal, image (x, y) having no distortion aberration and an image (x', y') having distortion aberration is derived.

However, the corresponding relationship between the distance r and the distance r' cannot be approximated with a high degree of accuracy using the function. Therefore, in the present embodiment, an optical simulation of the imaging-capturing optical system or a table obtained by the actual measurement value is used for the corresponding relationship between the distance r and the distance r'.

On the other hand, it is also possible to use a two-dimensional table directly representing the corresponding relationship between (x, y) and (x', y'). However, there is a problem in that the data amount of the two-dimensional table becomes enormous.

Therefore, in the present embodiment, as shown in Expression (12), the distortion aberration table d (r) is used, showing the corresponding relationship between distance r and distance r' obtained by optical simulation or measured values of the imaging-capturing optical system. As a result, (x', y') is obtained from (x, y) without using huge data. More specifically, (x', y') is obtained by Expressions (13) and (14).

[Mathematical Formula 10]

$$r' = d(r) \quad (12)$$

$$x' = x\frac{r'}{r} \quad (13)$$

$$y' = y\frac{r'}{r} \quad (14)$$

The image processing apparatus 50 obtains the pixel value of (x', y') of the input second image and converts the obtained pixel value of (x', y') into the pixel value of the first image (x, y), thus obtaining the first image having no distortion aberration.

Figure 9:
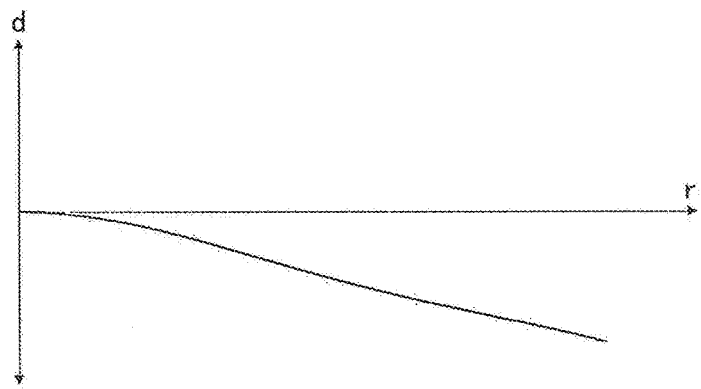
FIG. 9 shows an example of distortion.

FIG. 9 shows an example of distortion d (=(r'−r)/r). If the distortion aberration table d(r) is used, r' is as shown in Expression (12). In other words, the distortion aberration table d(r) represents a table that converts a distance r into a distance r', and varies depending on distance r. The distortion aberration table d(r) is obtained by optical simulation or measured values of the optical system and is memorized in the distortion aberration table memory unit 52 in FIG. 7.

Furthermore, the distortion aberration table d(r) changes according to the change when the zoom amount of the zoom lens of the optical system 41 changes. Therefore, the distortion aberration table d(r) corresponding to various zoom amounts is required. Therefore, the distortion aberration table memory unit 52 in FIG. 7 memorizes a plurality of distortion aberration tables d (r) corresponding to various zoom amounts.

The distortion aberration correction position information generation processing unit 53 is supplied with shooting information such as the zoom amount of the zoom lens from the optical system 41 in FIG. 6, and when the target pixel selection unit 51 selects the target pixel, the distortion aberration correction position information generation processing unit 53 generates the distortion aberration correction position information and supplies the distortion aberration correction position information to the distortion aberration correction position information memory unit 54.

<Processing with Distortion Aberration Correction Position Information Generation Processing Unit 53>

Figure 10:
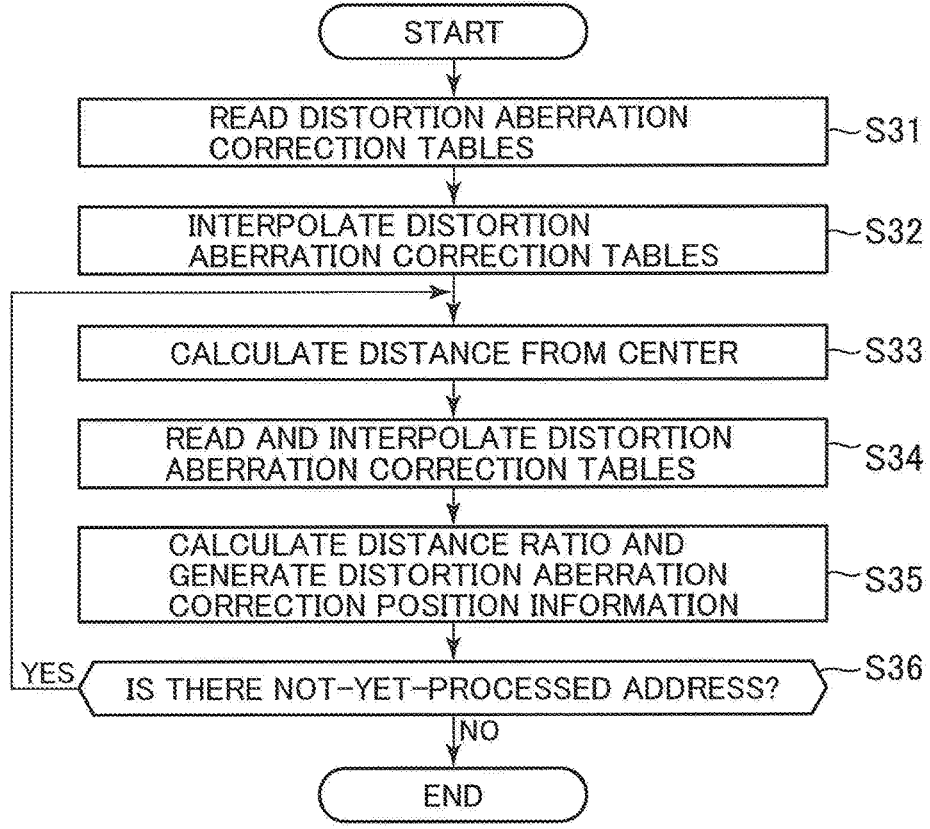
FIG. 10 is a flowchart for explaining processing of a distortion aberration correction position information generation processing unit.

FIG. 10 is a flowchart for explaining the processing of the distortion aberration correction position information generation processing unit 53 in FIG. 7.

In step S31, the distortion aberration correction position information generation processing unit 53 refers to the shooting information supplied from the optical system 41, for example, the zoom amount of the zoom lens, to reads multiple distortion aberration tables associated with zoom amount in the vicinity of zoom amount from the distortion aberration table memory unit 52 of FIG. 7. Then, step S32 is subsequently performed.

In step S32, the distortion aberration correction position information generation processing unit 53 interpolates each value of the plurality of distortion aberration tables read in step S31 using an interpolation method such as linear interpolation or Lagrangian interpolation. As a result, a distortion aberration table corresponding to the current zoom amount can be obtained. Then, the distortion aberration correction position information generation processing unit 53 selects an address not pet processed in the address space corresponding to the first image as the processing address (x, y). Then, step S33 is subsequently performed.

In step S33, the distortion aberration correction position information generation processing unit 53 calculates the distance r from the center of the processing address (x, y) up to a predetermined number of digits after the decimal point using Expression (9). Then, step S34 is subsequently performed.

In step S34, the distortion aberration correction position information generation processing unit 53 uses the interpolated distortion aberration table derived in step S32 and the distance r derived in step S33 to derive the distance r' stretched by distortion aberration. In this case, distances corresponding to values before and after the distance r obtained in step S33 are read from the complemented distortion aberration table, and the read distance is linearly interpolated. Thus, a highly accurate distance r' can be obtained. Then, step S35 is subsequently performed.

In step S35, the distortion aberration correction position information generation processing unit 53 uses the ratio between the distance r obtained in step S33 and the distance r' obtained in step S34 to calculate (x', y') up to a predetermined number of digits after the decimal point in accordance with Expressions (13) and (14). The distortion aberration correction position information generation processing unit 53 supplies (x', y') to the distortion aberration correction position information memory unit 54 as distortion aberration correction position information. Then, step S36 is subsequently performed.

In step S36, the distortion aberration correction position information generation processing unit 53 determines whether or not there is any not-yet-processed address. In the case of a positive determination result, i.e., in the case where there is a not-yet-processed address, step S33 is performed again. Then, processing from step S33 to step S36 is repeated until there is no more not-yet-processed address. Then, if a negative determination result is obtained in step S36, a series of processing is terminated.

The coefficient memory unit 55 in FIG. 7 memorizes coefficients for correcting resolution degradation for each shooting information (zoom amount, aperture value, and the like). The term "resolution degradation" as used herein refers to those caused by aberration other than distortion aberration, those caused by aperture blur due to diffraction or optical low pass filter. The coefficient is obtained by a learning method to be described latex.

<Processing with Coefficient Interpolation Processing Unit 56>

When the shooting information such as zoom amount and aperture value of the zoom lens is supplied from the optical system 41 in FIG. 6 to the coefficient interpolation processing unit 56 of FIG. 7, the coefficient interpolation processing unit 56 in FIG. 7 generates the position-specific coefficient corresponding to the current zoom amount or aperture value and supplies the position-specific coefficient to the position-specific coefficient memory unit 57.

Figure 11:
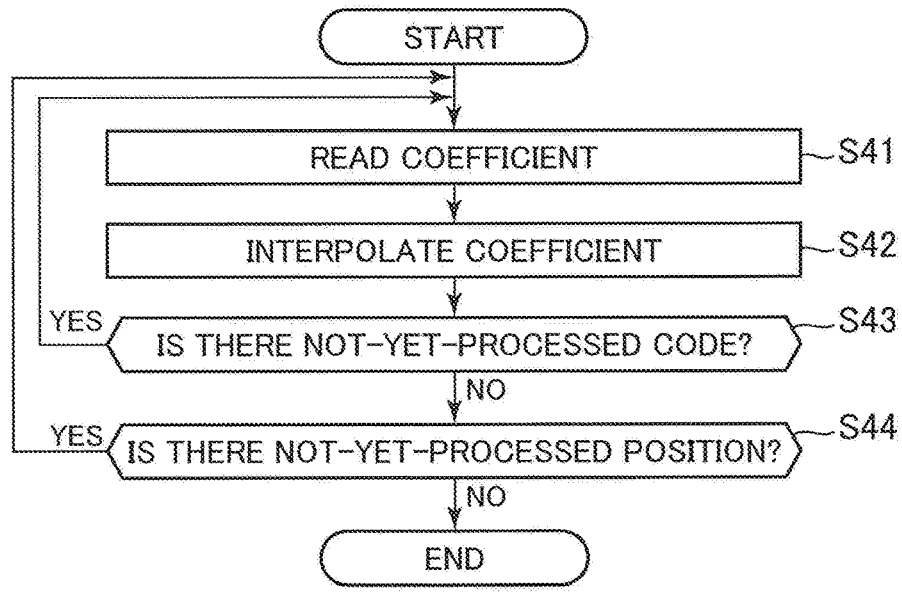
FIG. 11 is a flowchart explaining the processing of the coefficient interpolation processing unit.

FIG. 11 is a flowchart for explaining the processing of the coefficient interpolation processing unit 56.

In step S41, the coefficient interpolation processing unit 56 refers to the shooting information (for example, the zoom information of the zoom lens and the F value, a plurality of coefficient values corresponding to the interchangeable lens) supplied from the optical system 41 to read a plurality of coefficients corresponding to values in the vicinity of the current shooting information from the coefficient memory unit 55 of FIG. 7. Then, step S42 is subsequently performed.

In step S42, the coefficient interpolation processing unit 56 interpolates the plurality of coefficients read in step S41 by using an interpolation method such as linear interpolation or Lagrangian interpolation to supply the complemented coefficient (position-specific coefficient) to the position-specific coefficient memory unit 57 of FIG. 7. Then, step S43 is subsequently performed.

In step S43, the coefficient interpolation processing unit 56 determines whether or not there is any code (not-yet-processed code) that has not yet processed, and in the case of a positive determination result, a not-yet-processed code is selected. Then, step S41 is performed again. In the case of a negative determination result, step S44 is subsequently performed. More specifically, the processing from step S41 to step S43 is repeated until there is no longer any not-yet-processed code.

In step S44, the coefficient interpolation processing unit 56 determines whether or not there is any not-yet-processed position, and in the case of a positive determination result, a not-yet-processed position is selected. Then, step S41 is subsequently performed. In the case of a negative determination result, a series of processing is terminated, i.e., until there is no longer any not-yet-processed position, the processing from step S41 to step S44 is repeated.

As described above, in accordance with the current shooting condition, the distortion aberration correction position information is written to the distortion aberration correction position information memory unit 54, and the position-specific coefficient is written to the position-specific coefficient memory unit 57. Then, preparation for image conversion processing which converts from the first image to the second image by the image conversion apparatus 50 is completed.

<Image Conversion Processing with Image Conversion Apparatus 50>

When the image conversion apparatus 50 is supplied with the shooting information from the optical system 41 and is supplied with the image (first image) processed in the signal processing from the signal, processing unit 44, the image conversion apparatus 50 performs subsequent processing.

The target pixel selection unit 51 sequentially selects pixels constituting the second image as target pixels and supplies information indicating the selected target pixel to a predetermined block. The second image is an image to be generated and is an image from which the influence of aberration is removed from the first image.

Based on the address (x, y) representing the target pixel supplied from the: target pixel selection unit 51, the distortion aberration correction position information memory unit 54 reads the distortion aberration correction position information (x', y') memorized in the above-described processing. The distortion aberration correction, position information memory unit 54 rounds off the distortion aberration correction position information (x', y') to the nearest integer.

The distortion aberration correction position information memory unit 54 supplies integer position information, which is information obtained by rounding off the distortion aberration correction position information (x', y'), to a frame memory unit 58. The distortion, aberration correction position information memory unit 54 supplies several lower bits of the integer position information to the address sorting unit 59. The distortion aberration correction position information memory unit 54 supplies the information below the decimal point of the distortion aberration correction position information (x', y') to the first aberration correction unit 60.

Figure 12A:
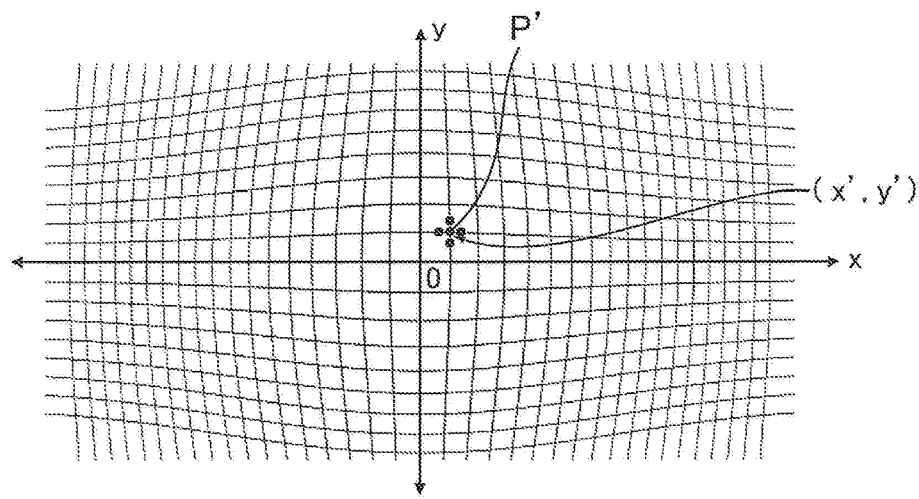
FIG. 12A is a conceptual diagram showing how to make a tap and how to read pixels in the vicinity of a first image with distortion aberration.
Figure 12B:
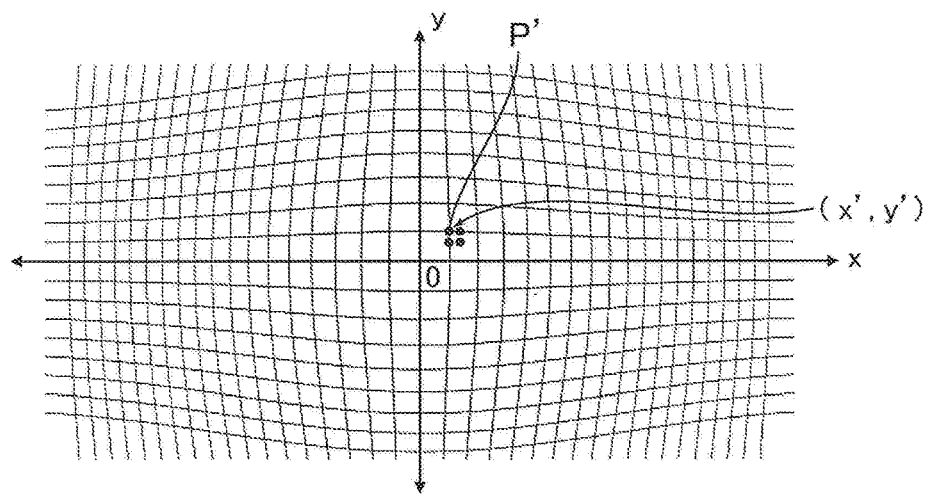
FIG. 12B is a conceptual diagram showing how to make a tap and how to read the pixel in the vicinity of the first image with distortion aberration.

The frame memory unit 58 reads the pixel values of each pixel of the first image in the raster scan order in accordance with the integer position information supplied from the distortion aberration correction position information memory unit 54, thus outputting the first image corrected in the distortion aberration correction. Furthermore, as shown in FIG. 12B, the frame memory unit 58 reads pixel values of four pixels or more near the pixel of the integer position information. The frame memory unit 58 supplies the read pixel values to the position information sorting unit 59.

In the first image (FIG. 8B) affected by the distortion aberration, there is an extended portion and a reduced portion as compared with the second image (FIG. 8A) having no distortion aberration. In order to beautifully convert from the second image to the first image so that jaggies do not appear, it is necessary to make taps to the pixels (link to multiple peripheral pixels) of the first image having distortion aberration as shown in FIG. 12A.

On the other hand, if the pixel value of each pixel is read from the first image memorized in the frame memory unit 58 according to the integer position information in the raster scan order, the pixel value of the pixel corresponding to the elongated portion may be skipped and the necessary pixel value may not be read. The reason for this is that the second image (FIG. 8A) has a higher information density than the first image (FIG. 8B) for the stretched part.

Therefore, when the frame memory unit 58 is supplied with the integer position information from the distortion aberration correction position information memory unit 54, as shown in FIG. 12B, the frame memory unit 58 reads from the first image the integer position information and the pixel value of 4 or more pixels in the vicinity and supplies the read pixel values to the position information sorting unit 59. This avoids the problem of failing to read necessary pixel values.

When the stretch ratio r'/r is 1 or less, the number of pixels in the vicinity of the integer position information is 1 pixel. When the stretch ratio r'/r is more than 1 and is 2 or less, the number of pixels in the vicinity of the integer position information is 2 pixels in each of the horizontal direction and the vertical direction, i.e., a total of 4 pixels. When the stretch ratio r'/r is more than 2, the number of pixels in the vicinity of the integer position information is 4 pixels or more.

The position information sorting unit 59 performs sorting processing with the position information so that vicinity pixels of the target pixel in FIG. 12A can be seen, on the basis of the pixel value (first image) supplied from the frame memory unit 58 in the raster scan order and the lower position information (several lower bits of the integer position information) supplied from the distortion aberration correction position information memory unit 54.

Figure 13:
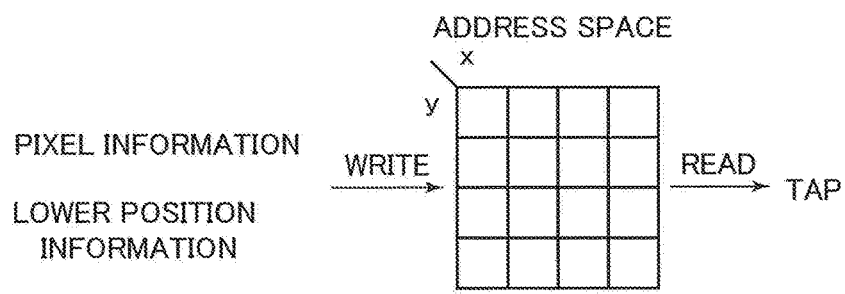
FIG. 13 is a conceptual diagram showing processing of a position information sorting unit.

FIG. 13 is a conceptual diagram showing the processing of the position information sorting unit 59. The position information sorting unit 59 has a storage medium such as a buffer memory or a register and stores a pixel value sequentially supplied from the frame memory unit 58 and the lower position information linked to the pixel value and supplied from the distortion aberration correction position information memory unit 54. Then, when the position information in the vicinity of the target pixel is selected, the pixel value in the vicinity of the target pixel is read from the position information sorting unit 59 as tap information. This tap information is supplied to the first aberration correction processing unit 60.

Figure 14:
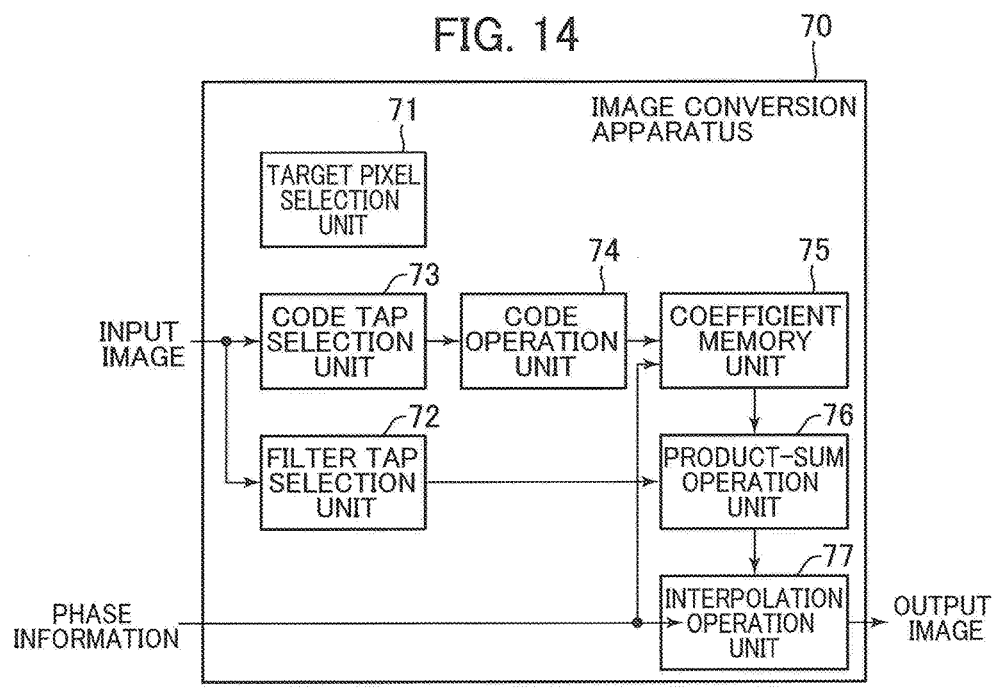
FIG. 14 is a block diagram showing a configuration example of an image conversion apparatus that performs minute aberration correction with a first aberration correction processing unit.

The first aberration correction processing unit 60 has an image conversion apparatus 70 shown in FIG. 14. The image conversion apparatus 70 performs phase shift correction as the first aberration correction on the input first image and outputs the third image processed in the first aberration correction. The third image is supplied to the second aberration correction processing unit 61.

Figure 26:
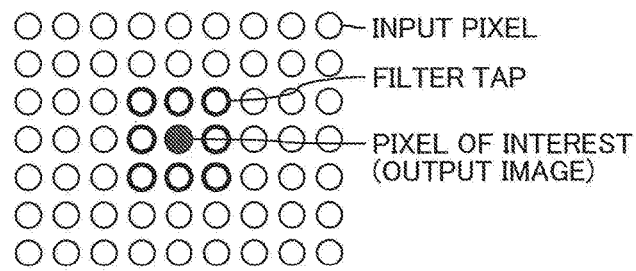
FIG. 26 is a diagram showing a configuration example of code taps selected by the code tap selection unit.

The second aberration correction processing unit 61 has an image conversion apparatus 110 shown in FIG. 26. The image conversion apparatus 110 performs aberration correction processing mainly for improving sharpness as the second aberration correction on the input third image and outputs the second image processed in the second aberration correction.

<Configuration Example of Image Conversion Apparatus 70>

The image conversion apparatus 70 is a code classification type adaptive filter that performs minute aberration correction processing of an input image, and more specifically, performs phase shift correction on the input image while suppressing jaggies and ringing which may occur in the input image.

As shown in FIG. 14, the image conversion apparatus 70 includes a target pixel selection unit 71, a code tap selection unit 72, a filter tap selection unit 73, a code operation unit 74, a coefficient memory unit 75, and a product-sum operation unit 76.

The input image (first image) supplied to the image conversion apparatus 70 is supplied to the code tap selection unit 72 and the filter tap selection unit 73. The input image is, for example, the pixel value of each color component of RGB.

The target pixel selection unit 71 sequentially selects pixels constituting the third image which is the output image of the image conversion apparatus 70 as target pixels and supplies information indicating the selected target pixels to the predetermined block.

For example, like the filter tap selection unit 12 in FIG. 1, the filter tap selection unit 72 selects pixel values of multiple pixels of the first image at positions close to the position of the target pixel as filter taps, and supplies the selected filter taps to the product-sum operation unit 76.

For example, like the filter tap selection unit 13 in FIG. 1, the code tap selection unit 73 selects pixel values of multiple pixels constituting the first image at positions close to the position of the target pixel as code taps, and supplies the selected code taps to the code operation unit 74.

Based on the code tap from the code tap selection unit 73, the code operation unit 74 computes, for example, a quantization value by DR quantization, a difference ratio from the central pixel value, and classifies it into a code indicating the feature amount of the code tap, and supplies the code to the coefficient memory unit 75.

The coefficient memory unit 75 memorizes a tap coefficient for each code. The tap coefficient is obtained through learning described later.

When the coefficient memory unit 75 is supplied with code from the code operation unit 74 and is supplied with phase information (fractional part information of distortion aberration correction position information) from the distortion aberration correction position information memory unit 54 shown in FIG. 7, the coefficient memory unit 75 reads a plurality of tap coefficients In the vicinity of the supplied phase information and corresponding to the given code. The read tap coefficients are supplied to the product-sum operation unit 76.

Figure 15:
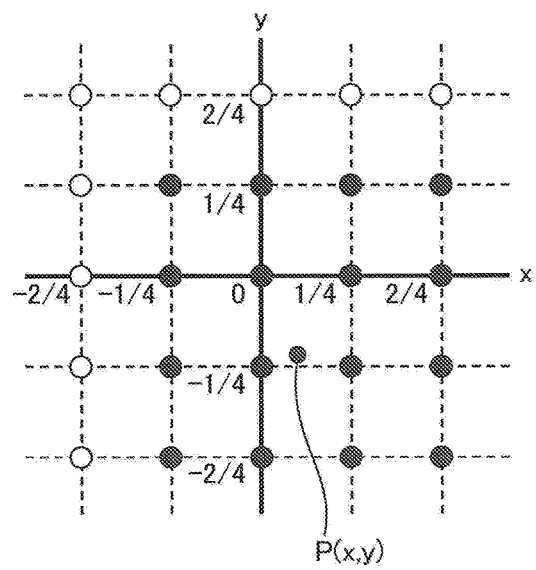
FIG. 15 is a conceptual diagram showing the selection method of the tap coefficient learning the phase shift amount from the phase information.

In the present embodiment, for example, as shown in FIG. 15, the coefficient memory unit 75 memorizes, for each code, totally 25 tap coefficients for shifting five phases, i.e., $\{-2/4, -1/4, 0, +1/4, +2/4\}$, each by 1/4 phase, in the horizontal direction and the vertical direction shown by white circle or black circle with respect to the origin point (the position of the target pixel). For example, a circle in the first place from the right and in the first place from the top represents a tap coefficient for shifting +2/4 phase in the horizontal direction and +2/4 phase in the vertical direction with respect to the origin point. A circle in the second place from the right and in the fourth place from the top represents a tap coefficient for shifting +1/4 phase in the horizontal direction and -1/4 phase in the vertical direction with respect to the origin point.

Then, when code is supplied to the coefficient memory unit 75, 25 tap coefficients corresponding to the supplied code are specified. Next, when the phase information is supplied to the coefficient memory unit 75, 16 tap coefficients centered on the phase information are selected from the 25 tap coefficients. For example, as shown in FIG. 15, when the pixel value at point P is generated, totally 16 tap coefficients (black circles) including four tap coefficients in each of the horizontal direction and the vertical direction are selected to shift the phase by 1/4 phase in the horizontal direction and the vertical direction about the supplied phase information. The selected tap coefficients are supplied to the product-sum operation unit 76.

Figure 16:
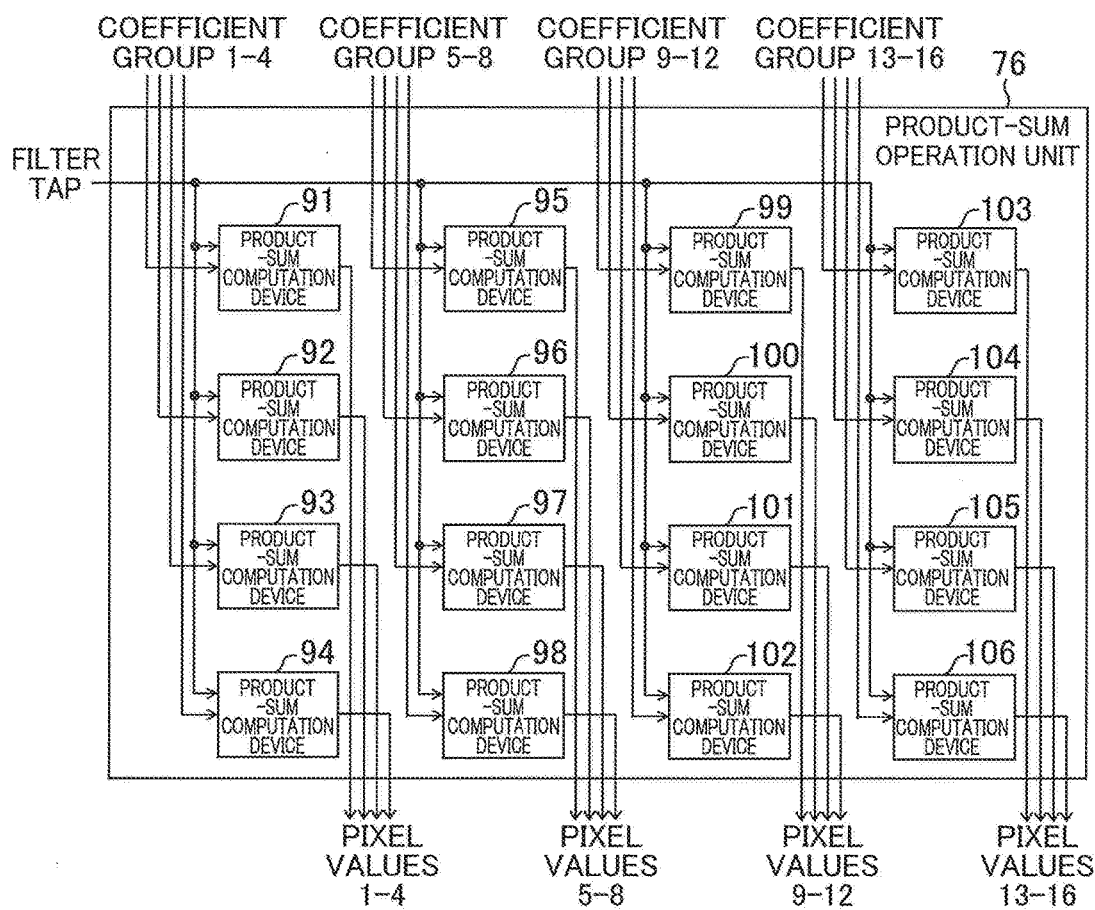
FIG. 16 is a diagram showing a configuration example of a product-sum operation unit.

As shown in FIG. 16, the product-sum operation unit 76 has 16 product-sum computation devices 91 to 106. The number of the product-sum computation devices 91 to 106 may correspond to the number of pixels required for interpolation processing of the interpolation operation unit 77, and is not limited to 16.

The filter taps (for example, pixel values of 13 pixels shown in FIG. 17 to be described later) are input into the product-sum computation devices 91 to 106. Furthermore, 16 tap coefficients shown in FIG. 15 are input into the product-sum computation devices 91 to 106. In the present embodiment, the number of selected tap coefficients is the same as the number of product-sum computation devices, but may be different from the number of product-sum computation devices.

The product-sum computation device 91 performs the product-sum computation using a coefficient group 1 (for example, a tap coefficient corresponding to a black circle at the first place from the left and the first place from the top of the 16 black circles in FIG. 15) and filter taps (for example, the pixel values of the 13 pixels explained above), and outputs a pixel value 1.

The product-sum computation device 92 performs the product-sum computation using a coefficient group 2 (for example, a tap coefficient corresponding to a black circle at the first place from the left and the second place from the top of the 16 black circles in FIG. 15) and filter taps (for example, the pixel values of the 13 pixels explained above), and outputs a pixel value 2.

Likewise, the product-sum computation devices 93, 94 perform the product-sum complication using coefficient group 3, 4 (for example, tap coefficients corresponding to black circles at the first place from the left and the third and fourth places from the top of the 16 black circles in FIG. 15) and filter taps (for example, the pixel values of the 13 pixels explained above), and outputs pixel values 3, 4.

The product-sum computation devices 95 to 98 perform the product-sum computation using coefficient group 5 to 8 (for example, tap coefficients corresponding to black circles at the second place from the left and the first to fourth places from the top of the 16 black circles in FIG. 15) and filter taps (for example, the pixel values of the 13 pixels explained above), and outputs pixel values 5 to 8. The product-sum computation devices 99 to 102 perform the product-sum computation using coefficient group 9 to 12 (for example, tap coefficients corresponding to black circles at the third place from the left and the first to fourth places from the top of the 16 black circles in FIG. 15) and filter taps (for example, the pixel values of the 13 pixels explained above), and outputs pixel values 9 to 12.

The product-sum computation devices 103 to 106 perform the product-sum computation using coefficient group 13 to 16 (for example, tap coefficients corresponding to black circles at the first place from the right and the first to fourth places from the top of the 16 black circles in FIG. 15) and filter taps (for example, the pixel values of the 13 pixels explained above), and outputs pixel values 13 to 16.

As described above, for the pixel value of the target pixel, the product-sum operation unit 76 supplies the multiple tap coefficients (coefficient groups 1 to 16) supplied from the coefficient memory unit 75 to the product-sum computation device 91 to 106 to obtain multiple pixel values 1 to 16 and supplies these multiple pixel values 1 to 16 to the interpolation operation unit 77.

The interpolation operation unit 77 performs interpolation processing with an interpolation method such as linear interpolation or a Lagrangian interpolation using the phase information supplied from the distortion aberration correction position information memory unit 54 for the multiple pixel values 1 to 16 supplied from the product-sum operation unit 76 with a finer precision than ¼ phase, and computes the pixel value of the target pixel, and outputs the third image obtained by the interpolation processing.

Although the computation load increases, the product-sum operation unit 76 and the interpolation operation unit 77 can be interchanged. More specifically, the interpolation operation unit 77 can interpolate multiple tap coefficients supplied from the coefficient memory unit 75 by an interpolation method such as linear interpolation or Lagrangian interpolation. In this case, the product-sum operation unit 76 may perform the product-sum computation using interpolated tap coefficients.

<Configuration Example of Filter Taps of Image Conversion Apparatus 70>

Figure 17:
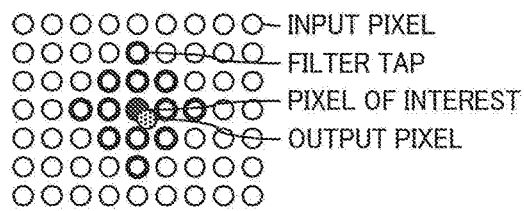
FIG. 17 is a diagram showing a configuration example of a filter tap selected by a filter tap selection unit.

FIG. 17 shows the configuration example of the filter tap selected by the filter tap selection unit 72 in FIG. 14.

A circle with a thin line indicates a pixel (input pixel) of the input image and also a pixel (output pixel) of the output image. A circle with a dot pattern indicates the output pixel where the phase difference of the pixel position has occurred with respect to the input pixel. More specifically, the output pixel exists at a position shifted phase from the input pixel. Therefore, the first image, which is the input image, is converted into the phase-shifted third image based on the phase information from the distortion aberration correction position information memory unit 54.

A black circle indicates a target pixel, i.e., an output pixel. A thick circle represents an input pixel serving as a filter tap. The reason why the black circle and the thick circle overlap each other is that the input pixel at the position corresponding to the target pixel is one of the filter tap.

The input pixels that become filter taps for the target pixel are selected, for example, with reference to the input pixel closest to the position of the input pixel corresponding to the target pixel.

<Configuration Example of Code Taps of Image Conversion Apparatus 70>

Figure 18:
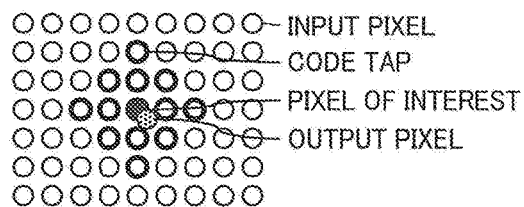
FIG. 18 is a figure illustrating a configuration example of code taps selected by a code tap selection unit.

FIG. 18 is a figure illustrating a configuration example of code taps selected by the code tap selection unit 73 in FIG. 14. A thick circle represents an input pixel which becomes a code tap. The other circles are the same as those in FIG. 17.

The input pixels that become code taps for the target pixel are selected with reference to the input pixel closest to the position of the input pixel corresponding to the target pixel. In the present embodiment, the filter tap and the code tap may be the same pattern as shown in FIG. 17 and FIG. 18 or different patterns.

<Configuration Example of Code Operation Unit 74>

Figure 19:
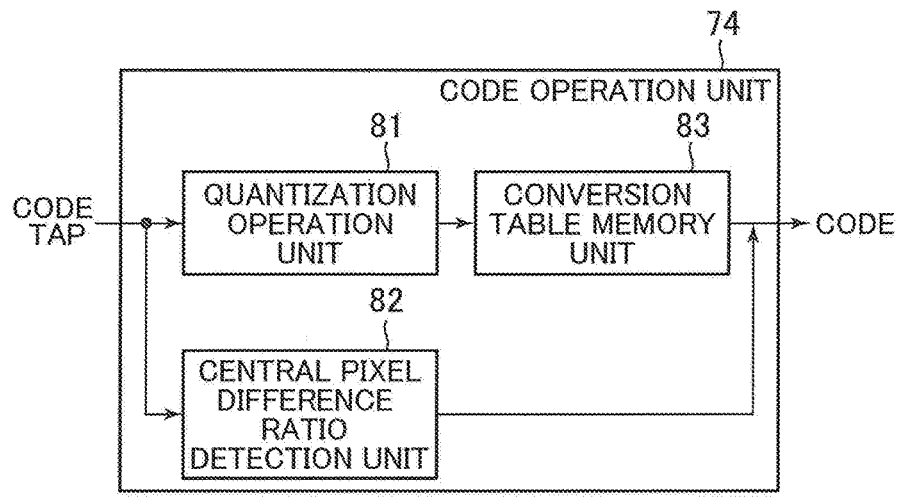
FIG. 19 is a block diagram showing a configuration example of a code operation unit.

FIG. 19 is a block diagram illustrating a configuration example of the code operation unit 74.

The code operation unit 74 includes a quantization operation unit 81, a central pixel difference ratio detection unit 82, and a conversion table memory unit 83.

The quantization operation unit 81 quantizes the pixel value of the input pixel constituting the code tap supplied from the code tap selection unit 73 using, for example, 1-bit DR quantization, and sorts the quantization value of each input pixel in a predetermined order and supplies the sorted quantization values to the conversion table memory unit 83 as quantization code.

Figure 20:
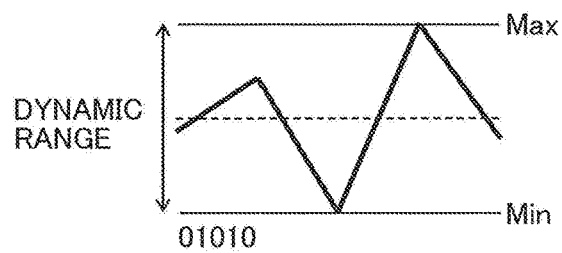
FIG. 20 is a diagram for explaining an example of 1-bit DR quantization performed by a quantization operation unit.

FIG. 20 is a diagram for explaining an example of 1-bit DR quantization. The horizontal axis represents the order (or position) of the input pixel constituting the code tap. The vertical axis represents the pixel value of the input pixel constituting the code tap.

In the 1-bit DR quantization, the minimum pixel value Min is subtracted from the maximum pixel value Max among the pixel values of the input pixels constituting the code taps to obtain a simple dynamic range DR. A revel at which the simple dynamic range DR is equally divided into two is set as a threshold value. The pixel value of each input pixel constituting the code tap is binarized based on the set threshold value and converted into a 1-bit quantization value. Those obtained by sorting the quantization values of the pixels in the predetermined order are the quantization code.

For example, in the case of the code tap shown in FIG. 18, 13 pixels constituting code taps are subject to 1-bit DR quantization processing. As a result, a 13-bit DR quantization code representing the feature amount of the input code tap is obtained.

The central pixel difference ratio detection unit 82 obtains the code from the pixel values of the input pixels constituting the code taps supplied from the code tap selection unit 73 and supplies the code to the coefficient memory unit 75 in FIG. 14.

Figure 21:
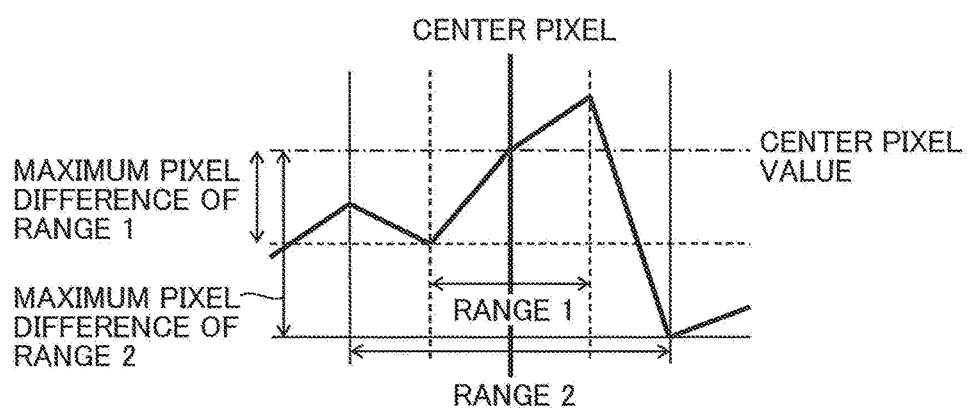
FIG. 21 is a diagram for explaining a central pixel difference ratio performed by a central pixel difference ratio detection unit.

FIG. 21 is a diagram for explaining the central pixel difference ratio performed by the central pixel difference ratio detection unit 82. The horizontal axis represents the position of the input pixel constituting the code tap. The vertical axis represents the pixel value of the input pixel constituting the code tap.

The central pixel difference ratio detection unit 82 performs the following processing.

First, the central pixel difference ratio detection unit 82 sets, as range 1, a predetermined range in which the target pixel (central pixel) is the center in the direction of the pixel position (horizontal axis), and sets, as range 2, a wide range in which the target pixel is the center and which includes the range 1.

Next, the central pixel difference ratio detection unit 82 calculates, in the range 1, a difference maximum value at which the difference between the pixel value of each pixel and the pixel value of the target pixel is the maximum. In the range 2, the central pixel difference ratio detection unit 82 computes, in the range 2, a difference maximum value at which the difference between the pixel value of each pixel and the pixel value of the target pixel is the maximum.

Then, the central pixel difference ratio detection unit 82 outputs code "1" if the ratio of the two difference maximum values is equal to or greater than the predetermined value, and outputs code "0" when the ratio is less than the predetermined value. As a result, 1-bit code is obtained. It is also possible to prepare multiple different predetermined values to be compared with the ratio of two difference maximum values and carry out finer code classification.

As described above, the central pixel difference ratio detection unit 82 sets the code tap to code "0" or "1" according to the ratio of the pixel difference between the narrow range and the wide range centered on the target pixel (central pixel). The code "0" indicates a state in which the pixel correlation between the target pixel (central pixel) and a far distance tap is high and ringing does not occur. The code "1" indicates a state in which the pixel correlation between target pixel (central pixel) and a far distance tap is low and ringing may occur. The code obtained by the central pixel difference ratio detection unit 82 is supplied to the coefficient memory unit 75 in FIG. 14.

The conversion table memory unit 83 previously memorizes a conversion table for converting the quantization code obtained by the quantization operation unit 81 into an address (new code). When the conversion table memory unit 83 supplied with the quantization code from the quantization operation unit 81, the conversion table memory unit 83 converts the supplied quantization code into a new code corresponding to the quantization code with reference to the conversion table, and supplies the converted code to the coefficient memory unit 75 in FIG. 14.

When the memory capacity of the coefficient memory unit 75 is sufficiently large, as shown in FIG. 22A, the conversion table memory unit 83 is unnecessary. In this case, each code obtained by the quantization operation unit 81 and the central pixel difference ratio detection unit 82 is directly supplied to the coefficient memory unit 75.

As shown in FIG. 22B, the conversion table memory unit 83 may convert a code whose occurrence frequency is lower than the threshold value into a representative predetermined address (new code). In the case where the tap coefficients approximating from different converted new codes are generated respectively, the conversion table memory unit 83 converts different converted new codes into the same code (different new codes may be unified into any one of the codes). As a result, the memory capacity of the coefficient memory unit 75 can be reduced.

The conversion table memorized in the conversion table memory unit 83 is prepared for each product-sum computation device, but it is not limited thereto. For example, as shown in FIG. 22C, in the case where multiple predetermined product-sum computation devices are supplied with multiple tap coefficients of the same or approximate values, a conversion table common to predetermined multiple product-sum computation devices may be prepared. More specifically, it is possible to combine multiple conversion tables into one.

<Image Conversion Processing with Image Conversion Apparatus 70>

Figure 23:
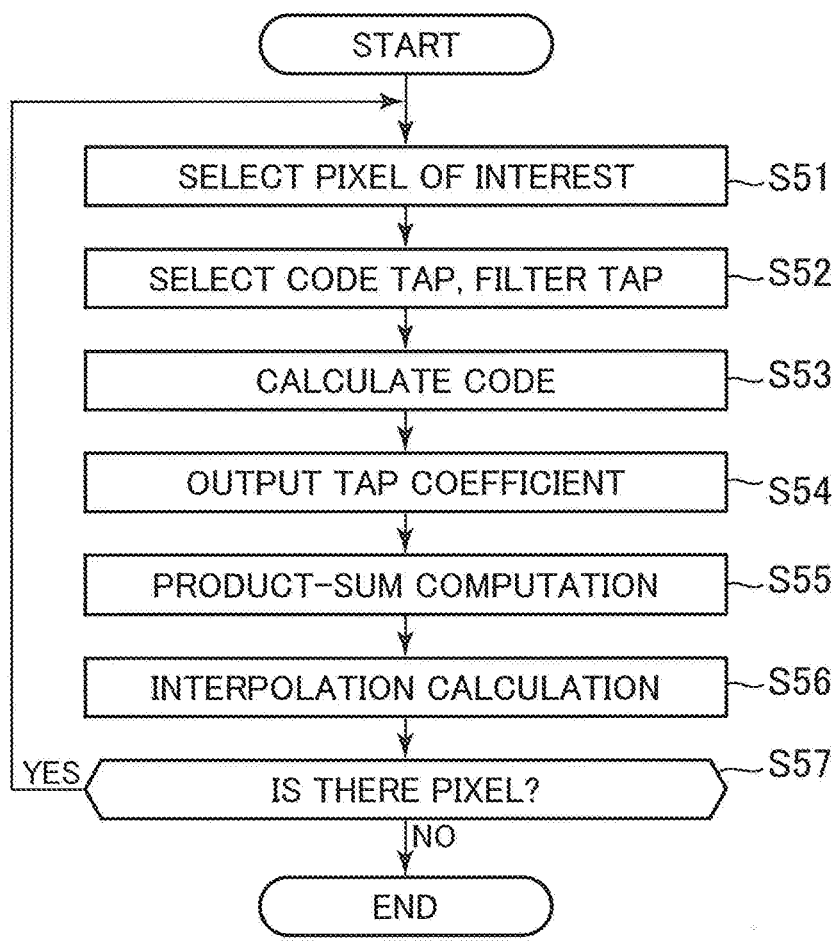
FIG. 23 is a flowchart explaining an example of image conversion processing by an image conversion apparatus.

FIG. 23 is a flowchart explaining an Example of image conversion processing by the image conversion apparatus 70 in FIG. 14.

In step S51, the target pixel selection unit 71 selects, as the target pixel, one of the pixels which have not yet been adopted as the pixel of interest from the pixels constituting the output image for the input image input to the image conversion apparatus 70. Then, step S52 is subsequently performed. For example, the target pixel selection unit 71 selects, as the target pixels, a pixel that has not yet selected as the target pixel from the pixels constituting the output image in the raster scan order.

In step S52, the code tap selection unit 72 selects the pixel constituting the code tap for the target pixel from the input image. The filter tap selection unit 73 selects the pixel constituting the filter tap for the target pixel from the input image. The code tap is supplied to the code operation unit 74, and the filter tap is supplied to the product-sum operation unit 76. Then, step S53 is subsequently performed.

In step S53, the code operation unit 74 performs code computation of the target pixel based on the code tap for the target pixel supplied from the code tap selection unit 72. The code operation unit 74 supplies the code of the target pixel obtained by the code computation to the coefficient memory unit 73. Then, step S54 is subsequently performed.

In step S54, the coefficient memory unit 75 selects and outputs tap coefficients that are stored at the address corresponding to the code supplied from the code operation unit 74 and that are multiple tap coefficients in the vicinity corresponding to phase information supplied from the distortion aberration correction position information memory unit 54 in FIG. 7. The product-sum operation unit 76 obtains multiple tap coefficients from the coefficient memory unit 75. Then, step S55 is subsequently performed.

In step S55, the product-sum operation unit 76 calculates a predetermined plurality of product-sum computations using the filter tap selected by the filter tap selection unit 72 and the multiple tap coefficients obtained by the coefficient memory unit 75. As a result, the product-sum operation unit 76 derives and outputs a plurality of pixel values. Then, step S56 is subsequently performed.

In step S56, the interpolation operation unit 77 performs interpolation according to the interpolation method such as linear interpolation or Lagrangian interpolation based on the multiple pixel values output by the product-sum operation unit 76 and the phase information supplied from the optical system 41. As a result, the pixel value of the target pixel is derived. Then, step S57 is subsequently performed.

In step S57, the target pixel selection unit 71 determines whether or not there is any pixel in the output image that has not yet been selected as target pixel. In the case of a positive determination result, step S51 is performed again to execute processing in step S51 and subsequent steps again. In the case of a negative determination result, this series of processing is terminated.

<How to Derive Tap Coefficient>

The tap coefficients stored in the coefficient memory unit 75 shown in FIG. 14 are obtained by the learning apparatus 20 shown in FIG. 3.

More specifically, the learning image storage unit 21 shown in FIG. 3 stores a high image quality image as a learning image.

The teacher data generation unit 22 changes a plurality of phases for student data (student image) to be described later by filtering the learning image stored in the learning image storage unit 21, and generates teacher data (supervisor image) in which phase has been shifted. The teacher data generation unit 22 supplies the generated teacher data to the teacher data storage unit 23.

The student data generation unit 24 generates student data (student image) by filtering the learning image stored in the learning image storage unit 21 or the like. The student data generation unit 24 supplies the generated student data to the student data storage unit 55.

The learning unit 26 reads the teacher data from the teacher data storage unit 23 and reads the student data from the student data storage unit 25. The learning unit 26 derives tap coefficients for each code and each phase by formulating and solving the normal equation of Expression (8) for each code and each phase using the teacher data and student data which are read.

As described above, the code is classified according to the ratio of the pixel difference for each of the narrow range and the wide range centered on the target pixel (central pixel). As a result, if the pixel correlation between the target pixel (central pixel) and the far distance tap is high and ringing does not occur, tap coefficients emphasizing the high frequency can be obtained. On the other hand, if the pixel correlation between the target pixel (central pixel) and the far distance tap is low and ringing may occur, tap coefficients suppressing ringing can be obtained.

The image conversion apparatus 70 in FIG. 14 can output the image for which the distortion aberration is corrected without reducing sharpness while preventing image quality deterioration due to jaggies and ringing by using the above tap coefficients.

<Configuration Example of Image Conversion Apparatus 110 of Second Aberration Correction Processing Unit 61>

Figure 24:
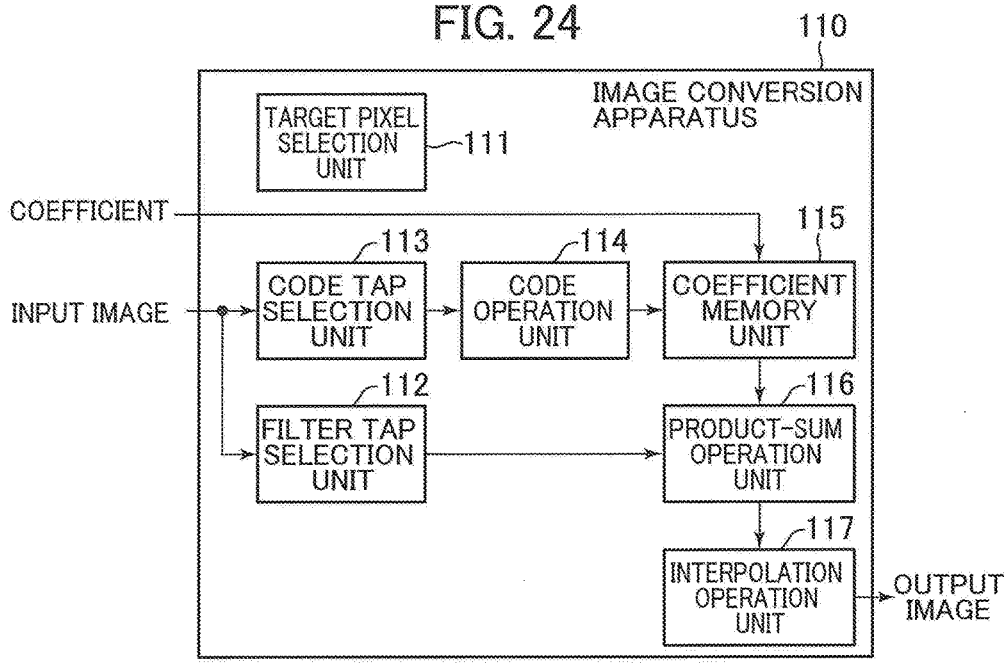
FIG. 24 is a block diagram showing a configuration example of an image conversion apparatus that performs aberration correction processing mainly for improvement of sharpness with a second aberration correction processing unit.

The second aberration correction processing unit 61 in FIG. 7 has the image conversion apparatus 110 shown in FIG. 24. The image conversion apparatus 110 performs aberration correction processing for mainly improving sharpness with respect to the third image whose distortion aberration has been corrected by the first aberration correction processing unit 60 by using the code classification type adaptive filter. In addition, the image conversion apparatus 110 performs not only sharpness improvement but also aberration correction for improving all kinds of deterioration of image caused by aberration.

The input image (third image) supplied to the image conversion apparatus 110 is supplied to a code tap selection unit 112 and a filter tap selection unit 113.

The target pixel selection unit 71 sequentially selects a pixel constituting the second image which is the output image of the image conversion apparatus 110 as a target pixel and supplies information indicating the selected target pixel to the predetermined block.

For example, like the filter tap selection unit 12 in FIG. 1, the filter tap selection unit 112 selects, as the filter taps, the pixel values of multiple pixels of the third image at positions close to the position of the target pixel, and supplies the selected filter taps to the product-sum operation unit 116.

For example, like the filter tap selection unit 13 in FIG. 1, the code tap selection unit 73 selects, as code taps, the pixel values of multiple pixels constituting the third image at positions close to the position of the target pixel, and supplies the selected code taps to the code operation unit 74.

Based on the code tap from the code tap selection unit 113, the code operation unit 114 computes the quantization value according to DR quantization, the difference ratio from the central pixel value, and the like, classifies the target pixel by code, and supplies the code to the coefficient memory unit 115.

Figure 28:
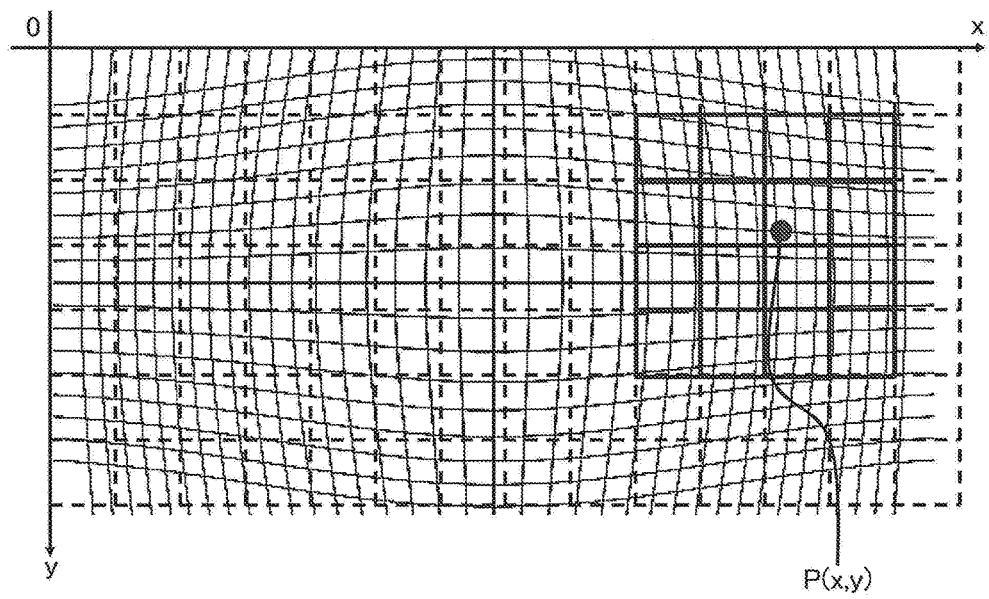
FIG. 28 is a conceptual diagram showing position information obtained by dividing position information from a target pixel selection unit.

The coefficient memory unit 115 memorizes a plurality of tap coefficients that are obtained by the coefficient interpolation processing unit 56 in FIG. 7, and that are tap coefficients for each code read with position information (block information) obtained by dividing the position information from the target pixel selection unit 111 as shown in FIG. 28.

The coefficient memory unit 115 selects and reads tap coefficients, among the stored tap coefficients, which are stored at the addresses corresponding to the codes supplied from the code operation unit 114, and which are multiple tap coefficients in the vicinity corresponding to the block information supplied from the target pixel selection unit 111. The multiple read tap coefficients are supplied to the product-sum operation unit 116. For example, as shown in FIG. 28, when the target pixel P is processed, the coefficients of totally 16 blocks including four horizontal and four vertical blocks are selected and supplied, as shown by the thick line in FIG. 28, which are necessary for the third order Lagrangian interpolation.

As shown in FIG. 16, the product-sum operation unit 116 has as many product-sum computation devices 91 to 106 as the number of pixels required for interpolation in the interpolation operation unit 117 (16 product-sum computation devices 91 to 106 in the present embodiment).

The product-sum operation unit 116 computes multiple of pixel values 1 to 16 by supplying a plurality of tap coefficients supplied from the coefficient memory unit 115 to the product-sum computation devices 91 to 106, and supplies the pixel values to the interpolation operation unit 117.

The interpolation operation unit 117 interpolates multiple pixel values 1 to 16 supplied from the product-sum operation unit 116 by interpolation method such as linear interpolation or Lagrangian interpolation using the position information supplied from the target pixel selection unit 111 and outputs the interpolated pixel values as an output image (second image).

Although the computation amount increases, the product-sum operation unit 116 and the interpolation operation unit 117 are interchangeable. More specifically, the interpolation operation unit 116 can interpolate multiple tap coefficients supplied from the coefficient memory unit 117 by an interpolation method such as linear interpolation or Lagrangian interpolation. At this occasion, the product-sum operation unit 116 may perform product-sum computation using the interpolated tap coefficients.

<Configuration Example of Filter Taps of Image Conversion Apparatus 110>

Figure 25:
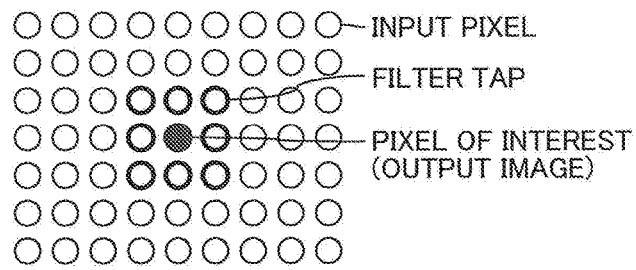
FIG. 25 is a diagram showing a configuration example of a filter tap selected by a filter tap selection unit.

FIG. 25 is a figure illustrating a configuration example of the filter taps selected by filter tap selection unit 112 in FIG. 24.

A circle with a thin line indicates an input pixel and also an output pixel. Unlike FIG. 17, the output pixel is converted to the same position as the input pixel.

A black circle indicates a target pixel, i.e., an output pixel. A thick circle represents an input pixel which becomes a filter tap. The reason why the black circle and the thick circle overlap each other is that the input pixel at the position corresponding to the target pixel is one of the filter tap.

for example, the input pixel which becomes the filter tap for the target pixel is selected with reference to the input pixel closest to the position of the input pixel corresponding to the target pixel.

<Configuration Example of Code Tap of Image Conversion Apparatus 110>

FIG. 26 is a figure illustrating a configuration example of the code taps selected fay the code tap selection unit 113 in FIG. 24. A thick circle represents an input pixel which becomes a code tap. The other circles are the same as those in FIG. 25.

For example, the input pixel which becomes the code tap for the target pixel is selected based on the input pixel closest to the position of the input pixel corresponding to the target pixel. In the present embodiment, the filter tap and the code tap may be the same pattern as shown in FIG. 25 and FIG. 26 or different patterns.

<Configuration Example of Code Operation Unit 114>

Figure 27:
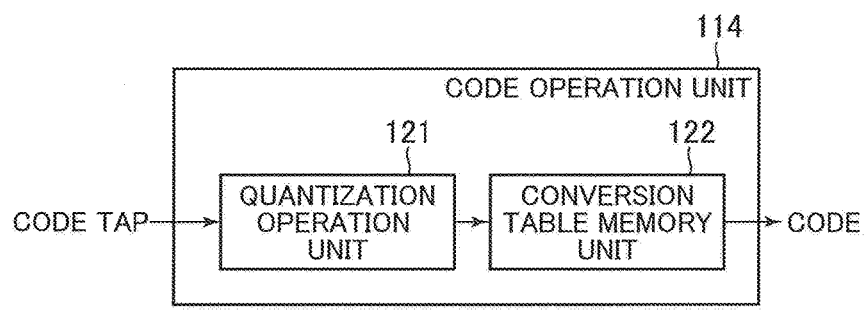
FIG. 27 is a block diagram showing a configuration example of a code operation unit.

FIG. 27 is a block diagram showing a configuration example of the code operation unit 114.

The code operation unit 114 includes a quantization operation unit 121 and a conversion table memory unit 122.

The quantization operation unit 121 quantizes the pixel value of the input pixel constituting the code tap supplied from the code tap selection unit 113 using, for example, 1-bit DR quantization as described above, sorts the quantization value of each input pixel in a predetermined order, and supplies the sorted quantization values to the conversion table memory unit 122 as quantization codes.

For example, in the case of code taps shown in FIG. 26, nine pixels constituting code tap are subject to 1-bit DR quantization processing. As a result, 9-bit DR quantization code representing the feature amounts of the input code taps is obtained.

The conversion table memory unit 122 previously memorizes a conversion table for converting the quantization code obtained by the quantization operation unit 121 into an address (new code). When the conversion table memory unit 122 is supplied with the quantization code, the conversion table memory unit 122 refers to the conversion table to convert the supplied quantization code into a new code corresponding to the quantization code, and supplies the converted code to the coefficient memory unit 115 in FIG. 24.

If the memory capacity of the coefficient memory unit 115 is sufficiently large, the conversion table memory unit 122 is unnecessary as shown in FIG. 22A. In this case, the quantization code obtained by the quantization operation unit 121 is directly supplied to the coefficient memory unit 115.

As shown in FIG. 22B, the conversion table memory unit 122 may convert a code whose occurrence frequency is lower than the threshold value into a representative predetermined address (new code). In the case where the tap coefficients approximating from different converted new codes are generated respectively, the conversion table memory unit 122 converts different converted new codes into the same code (different new codes may be unified into any one of the codes). As a result, the memory capacity of the coefficient memory unit 115 can be reduced.

The conversion table memorized in the conversion table memory unit 83 is prepared for each product-sum computation device, but it is not limited thereto. For example, as shown in FIG. 22C, when the tap coefficients of multiple identical or approximate values are supplied to a given multiple product-sum computation device, a conversion table common to predetermined multiple product-sum computation devices may be prepared. More specifically, multiple conversion tables can be combined into one.

<Image Conversion Processing with Image Conversion Apparatus 110>

Figure 29:
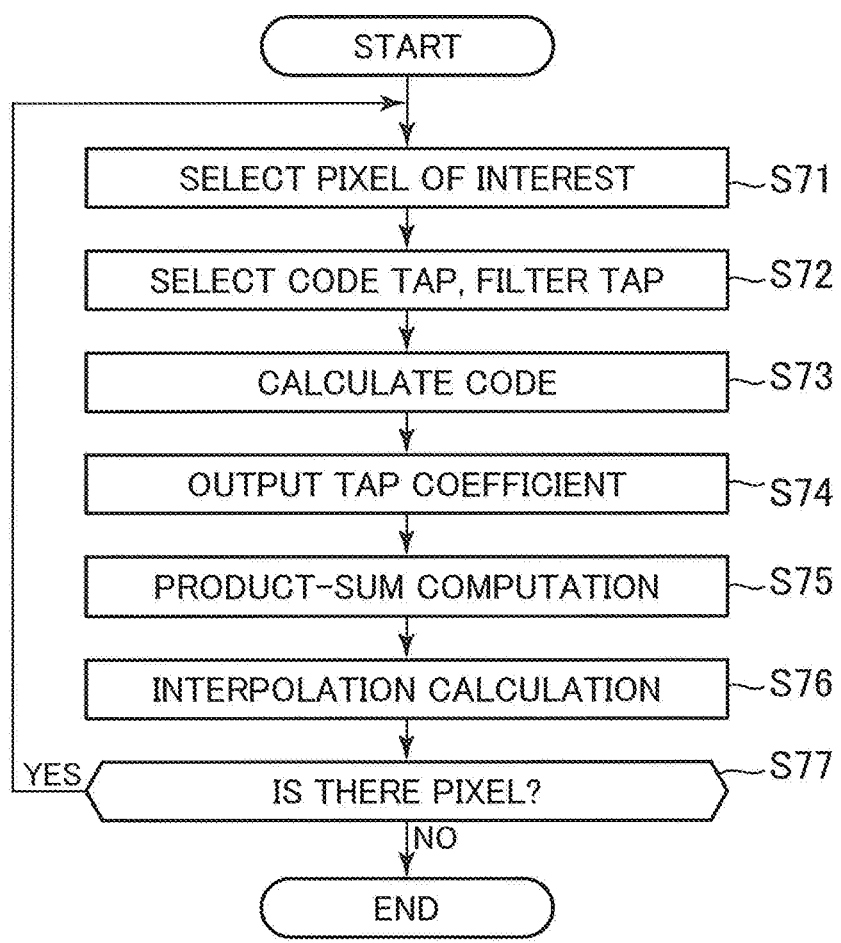
FIG. 29 is a flowchart explaining an example of image conversion processing with the image conversion apparatus.

FIG. 29 is a flowchart for explaining an example of image conversion processing by the image conversion apparatus 110 in FIG. 24.

In step S71, the target pixel selection unit 111 selects, as the target pixel, one of the pixels which have not yet been adopted as the pixel of interest from the pixels constituting the output image for the input image input to the image conversion apparatus 110. Then, step S72 is subsequently performed. For example, the target pixel selection unit 111 selects, as the target pixels, a pixel that has not yet selected as the target pixel from the pixels constituting the output image in the raster scan order.

In step S72, the code trip selection unit 112 selects the pixel constituting the code tap for the target pixel from the input image. The filter tap selection unit 113 selects the pixel constituting the filter tap for the target pixel from the input image. The code tap is supplied to the code operation unit 114, and the filter tap is supplied to the product-sum operation unit 116. Then, step S73 is subsequently performed.

In step S73, the code operation unit 114 performs code computation of the target pixel based on the code tap for the target pixel supplied from the code tap selection unit 112. The code operation unit 114 supplies the code of the target pixel obtained by the code computation to the coefficient memory unit 115. Then, step S74 is subsequently performed.

In step S74, the coefficient memory unit 115 memorizes coefficients for each position information (block information) supplied from the target pixel selection.

The coefficient memory unit 115 selects and reads tap coefficients, among the stored tap coefficients, which are stored at the addresses corresponding to the codes supplied from the code operation unit 114, and which are multiple tap coefficients in the vicinity corresponding to the block information supplied from the target pixel selection unit 111. The product-sum operation unit 116 obtains a plurality of tap coefficients output from the coefficient memory unit 115. Then, step S75 is subsequently performed.

In step S75, the product-sum operation unit 116 performs multiple predetermined product-sum computations using the filter tap selected by filter tap selection unit 112 and multiple tap coefficients obtained from the coefficient memory unit 115. As a result, the product-sum operation unit 116 derives and outputs multiple pixel values. Then, step S76 is subsequently performed.

In step S76, the interpolation operation unit 117 performs interpolation with an interpolation method such as linear interpolation or Lagrangian interpolation based on multiple of pixel values output by the product-sum operation unit 116 and phase information supplied from the optical system 41. As a result, the pixel value of the target pixel is derived. Then, step S77 is subsequently performed.

In step S77, the target pixel selection unit 111 determines whether or not there is any pixel in the output image which has not yet been selected as the target pixel. In the case of a positive determination result, step S71 is performed again to execute processing in step S51 and subsequent steps again. In the case of a negative determination result, this series of processing is terminated.

<How to Derive Tap Coefficient>

The tap coefficients memorized in the coefficient memory unit 115 shown in FIG. 24 are obtained by the learning apparatus 20 shown in FIG. 3.

More specifically, the learning image storage unit 21 shown in FIG. 3 stores a high image quality image with high sharpness as a learning image.

The teacher data generation unit 22 supplies the learning image stored in the learning image storage unit 21 to the teacher data storage unit 23 as teacher data (supervisor image) as it is.

The student data generation unit 24 reads the learning image from the learning image storage unit 21 and uses optical simulation data and distortion aberration correction data and the like based on the design data of the optical system 41 in FIG. 6 for the read learning image to generate student data (student image) with degraded image quality. The student data generation unit 24 supplies the generated student data to the student data storage unit 25.

The learning unit 26 reads the teacher data from the teacher data storage unit 23 and reads the student data from the student data storage unit 25. The learning unit 26 derives tap coefficients for each code and each phase by formulating and solving the normal equation of Expression (8) for each code and each phase using the teacher data and student data which are read.

As described above, the learning apparatus 20 can obtain tap coefficients for correcting any aberration by classifying and learning the code according to position information about the image (lens).

The image conversion apparatus 110 in FIG. 24 can uses the tap coefficients can obtain a uniform output image in which vignetting and the reduction of the sharpness do not occur while correcting an image of which image has been degraded by aberration other than distortion aberration, for example, spherical aberration, coma aberration, critical point aberration, field curvature, magnification color aberration and the like.

<Image Conversion Processing with Image Conversion Apparatus 50>

FIG. 30 is a follow-up chart explaining an example of image conversion processing by the image conversion apparatus 50 in FIG. 7.

In step S91, the image conversion apparatus 50 obtains shooting information such as zoom value of the imaging-capturing lens and F value of the aperture from the optical system 41 in FIG. 6. Then, step S92 is subsequently performed.

In step S92, the distortion aberration correction position information generation processing unit 53 in FIG. 7 extracts the aberration correction table is the vicinity of the shooting information such as predetermined soon value and the like from the aberration correction table memory unit 52 based on the shooting information such as the zoom value input in step S91. The distortion aberration correction position information generation processing unit 53 generates distortion aberration correction position information up to the decimal point according to the flowchart shown in FIG. 10. The generated distortion aberration correction position information is memorized in the distortion aberration correction position information memory unit 54.

The coefficient interpolation processing unit 56 reads the coefficient information in the vicinity of the shooting information such as the zoom value and F value input in the step S91 from the coefficient memory unit 55 and generates the predetermined zoom value and the position-specific coefficient of F value in accordance with the flowchart of FIG. 11 described above. The generated position-specific coefficients are memorized in the position-specific coefficient, memory unit 57.

In step S93, the first image is written to the frame memory unit 58 in FIG. 7. Then, step S94 is subsequently performed.

In step S94, the target pixel selection unit 51 selects, as the target pixel, one of the pixels which have not yet been adopted as the pixel of interest from the pixels constituting the second image for the first image memorized in the frame memory unit 58. More specifically, the target pixel selection unit 51 selects, as the target pixels, a pixel that has not yet selected as the target pixel from the pixels constituting the second image in the raster scan order. Then, step S95 is subsequently performed.

In step S95, the distortion aberration correction position information memory unit 54 reads the stored distortion aberration correction position information (x', y') on the basis of the address (x, y) representing the target pixel supplied from the target pixel selection unit 51. The distortion aberration correction position information memory unit 54 rounds off the read distortion aberration correction position information (x', y') to the nearest integer.

The distortion aberration correction position information memory unit 54 supplies the integer position information, which is information obtained by rounding off the distortion aberration correction position information (x', y'), to the frame memory unit 58. The distortion aberration correction position information memory unit 54 supplies several lower bits of the integer position information to the address sorting unit 59. The distortion aberration correction position information memory unit 54 supplies the fractional part information of the distortion aberration correction position information (x', y') to the first aberration correction unit 60. Then, step S96 is subsequently performed.

In step S96, for example, the frame memory unit 58 reads the pixel values of the pixels of the first image in the raster scan order in accordance with the integer position information supplied from the distortion aberration correction position information memory unit 54, and outputs the first image corrected in the distortion aberration correction in units of pixels.

Further, as shown in FIG. 12B, the frame memory unit 58 reads pixel values of four or more pixels in the vicinity of the pixel of the integer position information. The frame memory unit 58 supplies the pixel values to the position information sorting unit 59. Then, step S97 is subsequently performed.

In step S97, the position information sorting unit 59 performs sorting processing to sort the pixel values supplied from the frame memory unit 58 in the raster scan order according to the lower position information (several lower bits of the position information) supplied from the distortion aberration correction position information memory unit 54. As a result, the position information sorting unit 59 finds the vicinity pixels of the target pixel in FIG. 12A and supplies the tap information (pixel values) in the vicinity of the target pixel as the first image to the first aberration correction processing unit 60. Then, step S98 is subsequently performed.

In step S98, the first aberration correction unit 60 performs correction processing of distortion aberration based on the tap information in the vicinity of the target pixel supplied from the position information sorting unit 59 and the fractional part position information supplied from the distortion aberration correction position information memory unit 54 and outputs the third image. The third image is supplied to the second aberration correction unit 61. Then, step S99 is subsequently performed.

In step S99, the second aberration correction unit 61 performs aberration correction other than distortion aberration on the third image supplied from the first aberration correction unit 60 by using the target pixel information supplied from the target pixel selection unit 51 and the position-specific coefficient supplied from the position-specific coefficient memory unit 57, and outputs a second image. Then, step S100 is subsequently performed.

In step S100, the target pixel selection unit 51 determines whether or not there is an output image that has not yet been selected as a target pixel. In the case of a positive determination result, step S94 is performed again to repeat the processing in step S94 and subsequent steps. In the case of a negative determination result, the series of processing is terminated.

<Other Configuration Example of First Aberration Correction Processing Unit 60>

The first aberration correction processing unit 60 may be configured to have the image conversion apparatus 150 shown in FIG. 31 instead of the image conversion apparatus 70 shown in FIG. 14.

For example, the pixel value of each color component of RGB is input as input image (first image) into the image conversion apparatus 150. The image conversion apparatus 150 corrects a small distortion aberration of the input image and obtains an output image suppressing jaggies and ringing that can occur in the image. As a small distortion aberration correction of the input image, the image conversion apparatus 150 performs image processing for converting the input image into an image with improved distortion aberration, interpolation processing with sine function, interpolation processing with triangular wave filter (linear interpolation processing), and the like.

The image conversion apparatus 150 performs horizontal and vertical interpolation processing by a sine function and obtains an image of an image signal Vc as follows.

In this case, let $\Delta t$ be the pixel interval of the image signal Va. Let $x(n\Delta t)$ be pixel data of pixel position $n\Delta t$ of image signal Va. Let t be the pixel position of the image signal Vc. The pixel data $x(t)$ at the pixel position t is obtained by using the pixel values of N (suitable finite number) pixels of the image signal Va positioned before and after the pixel position t according to Expression (15) as follows.

[Mathematical Formula 11]

$$x(t) = \sum_{n=0}^{N-1} x(n\Delta t) \frac{\sin\left(\frac{\pi}{\Delta t}(t - n\Delta t)\right)}{\frac{\pi}{\Delta t}(t - n\Delta t)} \quad (15)$$

As shown in FIG. 31, the image conversion apparatus 150 has a target pixel selection unit 151, a vertical interpolation unit 152, and a horizontal interpolation unit 153. The input image supplied to the image conversion apparatus 150 is supplied to the vertical interpolation unit 152.

The target pixel selection unit 151 sequentially selects pixels constituting the output image as target pixels and supplies information indicating the selected target pixel to the predetermined block.

The vertical interpolation unit 152 performs vertical interpolation processing on the target pixel using the pixel values of the input image and supplies the vertical interpolated image to the horizontal interpolation unit 153. The horizontal interpolation unit 153 performs horizontal interpolation processing on the target pixel using the image supplied from the vertical interpolation unit 152, and outputs horizontal interpolated image as the output, image (third image).

[Second Embodiment]

Subsequently, the second embodiment of the present invention will be explained.

The digital camera 40 according to the first embodiment shoots still images or moving images without aberration using the design information about the optical system. However, if an interchangeable lens made by another company is to be used, the design information of the optical system cannot be obtained, and in this case, the digital camera 40 according to the first embodiment cannot be used.

On the other hand, a digital camera according to a second embodiment is capable of shooting still images or moving images even when the design information of the optical system is not available, for example, when a third-party interchangeable lens is used.

The digital camera according to the second embodiment is constructed almost in the same manner as the first embodiment. However, the image correction unit 45 shown in FIG. 6 has an image conversion apparatus 160 shown in FIG. 32 instead of the image conversion apparatus 50 shown in FIG. 6. It should be noted that the image conversion apparatus 160 can be used independently for geometric conversion such as image editing.

Figure 32:
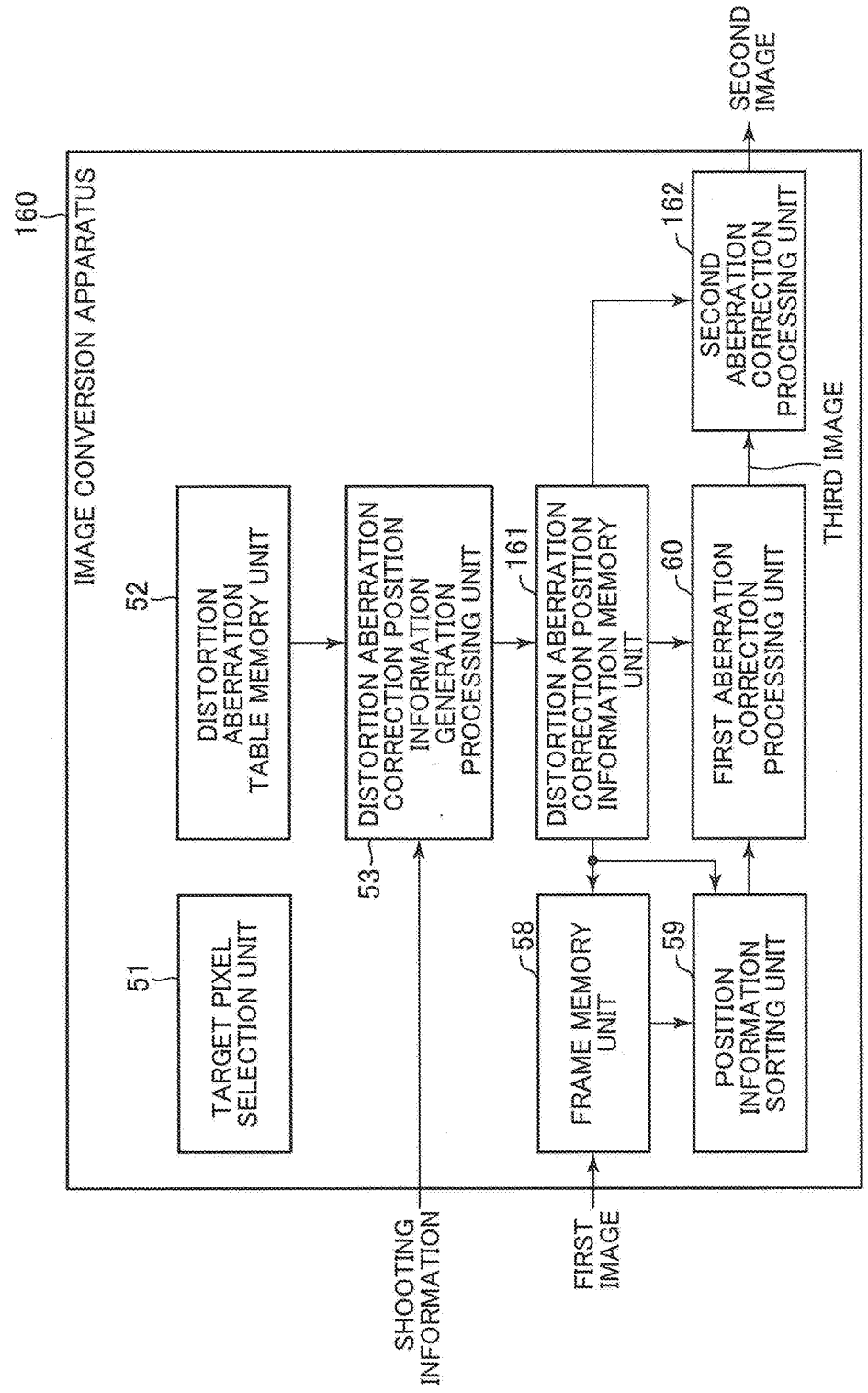
FIG. 32 is a block diagram showing another configuration example of an image conversion apparatus for performing aberration correction processing performed by the image correction unit.

FIG. 32 is a block diagram showing a configuration example of the image conversion apparatus 160. Hereinafter, the same reference numerals are given to the same parts as those described above, and redundant explanation will be omitted.

Like the image conversion apparatus 50 of FIG. 7, the image conversion apparatus 160 includes a target pixel selection unit 51, a distortion aberration table memory unit 52, a distortion aberration correction position information generation processing unit 53, a frame memory unit 58, a position information sorting unit 59, and a first aberration correction processing unit 60.

As compared with the image conversion apparatus 50 shown in FIG. 7, the image conversion apparatus 160 does not have the coefficient memory unit 55, the coefficient interpolation processing unit 56, and the position-specific coefficient memory unit 57, but the image conversion apparatus 160 includes the distortion aberration correction position information memory unit 161 and the second aberration correction processing unit 162 instead of the distortion aberration correction position information memory unit 54 and the second aberration correction processing unit 61.

Based on the address (x, y) representing the target pixel supplied from the target pixel selection unit 51, the distortion aberration correction position information memory unit 161 reads the distortion aberration correction position information (x', y') stored in the above-described processing. The distortion aberration correction position information memory unit 161 rounds off the distortion aberration correction position information (x', y') to the nearest integer.

The distortion aberration correction position information memory unit 161 supplies the integer position information, which is information obtained by rounding off the distortion aberration correction position information (x', y'), to the frame memory unit 58. The distortion aberration correction position information memory unit 161 supplies several lower bits of the integer position information to the address sorting unit 59. The distortion aberration correction position information memory unit 161 supplies the fractional part information of the distortion aberration correction position information (x', y') to the first aberration correction unit 60. Further, the distortion aberration correction position information memory unit 161 supplies the distance (Δx, Δy) from the adjacent pixel to the second aberration correction processing unit 162.

<Configuration Example of Image Conversion Apparatus 170>

Figure 33:
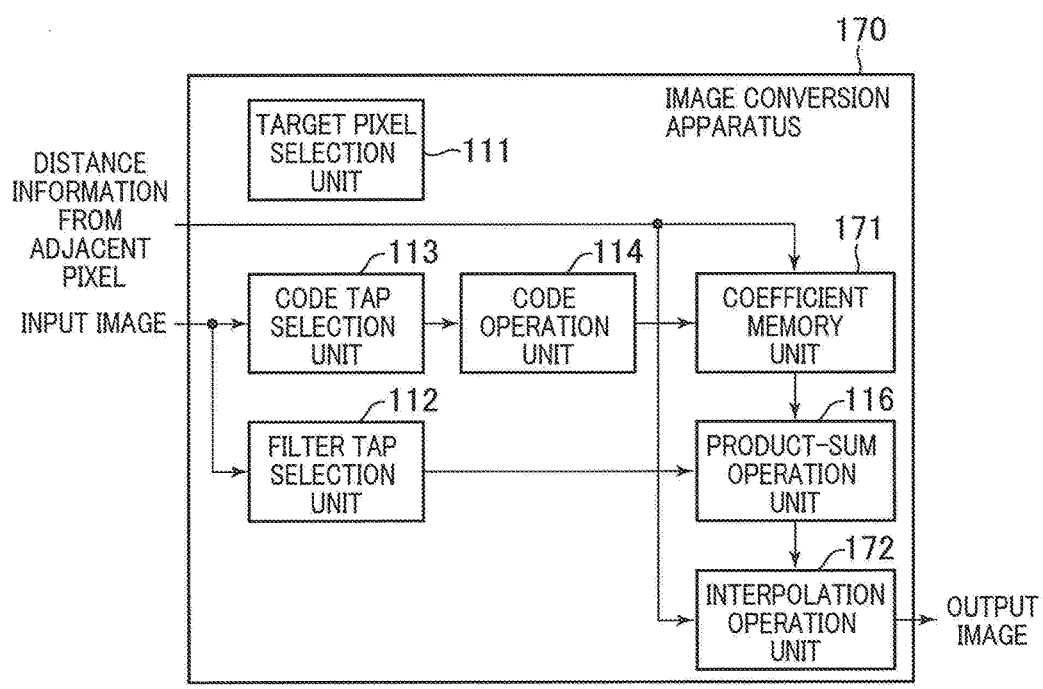
FIG. 33 is a block diagram showing a configuration example of an image conversion apparatus that performs aberration correction processing mainly for improvement of sharpness with the second aberration correction processing unit.

The second aberration correction processing unit 162 has the image conversion apparatus 170 of FIG. 33. The image conversion apparatus 170 mainly performs aberration correction processing for improvement of sharpness.

Like the image conversion apparatus 110 of FIG. 24, the image conversion apparatus 170 includes a target pixel selection unit 111, a code tap selection unit 112, a filter tap selection unit 113, a code operation unit 114, and a product-sum operation unit 116.

However, as compared with the image conversion apparatus 110 of FIG. 24, the image conversion apparatus 170 includes a coefficient memory unit 171 and an interpolation operation unit 172 instead of the coefficient memory unit 115 and the interpolation operation unit 117.

The coefficient memory unit 171 memorizes a plurality of tap coefficients obtained by a learning method to be described later. Based on the distance information (Δx, Δy) with adjacent pixels supplied from the distortion aberration correction position information memory unit 161 in FIG. 32 and the code supplied from the code operation unit 114, the coefficient memory unit 171 selects multiple coefficients in the vicinity of the distance information (Δx, Δy) stored at the address corresponding to the code. Then, the coefficient memory unit 171 reads the selected multiple coefficients and supplies the coefficients to the product-sum operation unit 116.

The product-sum operation unit 116 has as many product-sum computation devices as the number of pixels required for interpolation in the interpolation operation unit 172. The product-sum operation unit 116 computes multiple pixel values by supplying multiple tap coefficients supplied from the coefficient memory unit 171 to the product-sum computation devices, and supplies the computed pixel values to the interpolation operation unit 172.

The interpolation operation unit 172 interpolates multiple pixel values supplied from the product-sum operation unit 116 by interpolation method such as linear interpolation or Lagrangian interpolation using the distance information (Δx, Δy) from the adjacent pixel supplied from the distortion aberration correction position information memory unit 161 of FIG. 32 and obtains an output image (second image).

Although the computation amount increases, the product-sum operation unit 116 and the interpolation operation unit 172 are interchangeable. More specifically, the interpolation operation unit 116 can interpolate multiple tap coefficients supplied from the coefficient memory unit 172 by an interpolation method such as linear interpolation or Lagrangian interpolation. At this occasion, the product-sum operation unit 116 may perform product-sum computation using the interpolated tap coefficients.

The image conversion apparatus 170 configured as described above can perform image conversion processing similarly to the flowchart shown in FIG. 29.

<How to Derive Tap Coefficient>

The tap coefficients memorized in the coefficient memory unit 171 shown in FIG. 33 are obtained by the learning apparatus 20 shown in FIG. 3.

Specifically, the learning image storage unit 21 shown in FIG. 3 stores a high image quality image with high sharpness as a learning image.

The teacher data generation unit 22 supplies the learning image stored in the learning image storage unit 21 to the teacher data storage unit 23 as teacher data (supervisor image) as it is.

The student data generation unit 24 reads the learning image from the learning image storage unit 21 and generates student data (student image) having a lower level of sharpness than the teacher data through filtering of the read learning image with a low pass filter or the like. The student data generation unit 24 supplies the generated student data to the student data storage unit 25.

The learning unit 26 reads the teacher data from the teacher data storage unit 23 and reads the student data from the student data storage unit 25. The learning unit 26 formulates and solves normal expression of Expression (8) by normalizing the normal equation of Expression (8) for each code and for each coefficient of the horizontal and vertical low-pass filters by using the teacher data and student data which are read, thus capable of deriving the tap coefficients for each coefficient of the vertical low pass filter.

<Image Conversion Processing with Image Conversion Apparatus 160>

Figure 34:
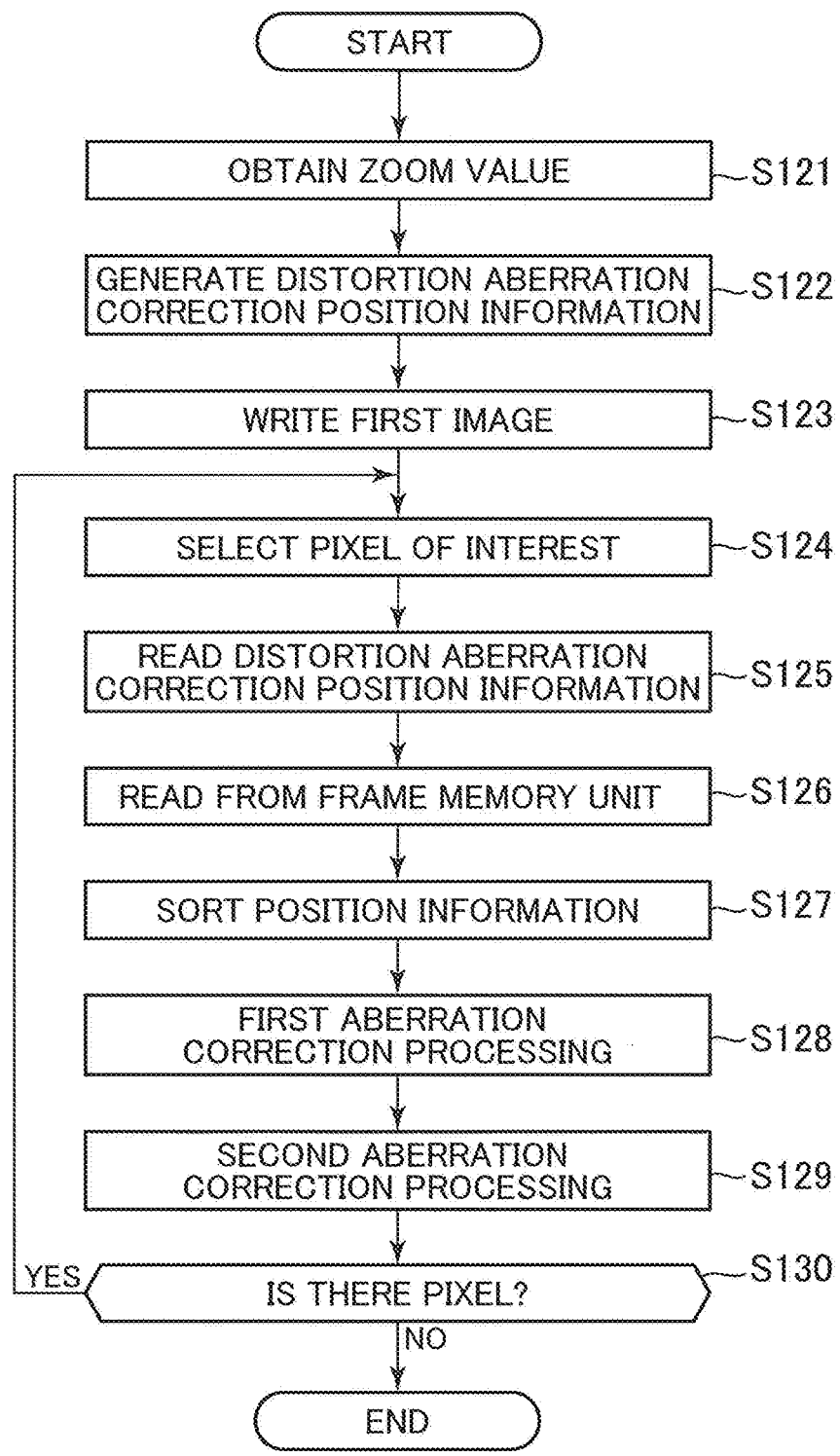
FIG. 34 is a flowchart explaining an example of image conversion processing with the image conversion apparatus.

FIG. 34 is a follow-up chart explaining an example of image conversion processing by the image conversion apparatus 160 in FIG. 32. As compared with the processing from step S91 to step S96 shown in FIG. 30, the processing from step S121 to step S126 is performed in a similar manner except that the acquisition of F value (step S91) and the generation of position-specific coefficient (step S92). The processing in step S127 and subsequent steps will be described below.

In step S127, the position information sorting unit 53 performs the same processing as in step S97 and supplies tap information (pixel value) in the vicinity of the target pixel to the first aberration correction processing unit 60 as the first image. Further, the position information sorting unit 59 supplies the distance information ($\Delta x$, $\Delta y$) from the adjacent pixel to the second aberration correction processing unit 162. Then, step S128 is subsequently performed.

In step S128, the first aberration correction unit 60 performs the same processing as step S97, performs correction processing of distortion aberration, and outputs the third image. Then, step S129 is subsequently performed.

In step S129, as described above, the second aberration correction unit 162 performs aberration correction other than distortion aberration (for example, sharpness improvement processing and the like) on the third image supplied from the first aberration correction unit 60 by using the target pixel information supplied from the target pixel selection unit 51 and the distance information ($\Delta x$, $\Delta y$) from the adjacent pixel supplied from the distortion aberration correction position information memory unit 161, and outputs a second image. Then, step S130 is subsequently performed.

In step S130, the target pixel selection unit 51 determines whether or not there is any output image that has not yet been selected as a target pixel. In the case of a positive determination result, step S124 is performed again to repeat the processing in step S124 and subsequent steps. In the case of a negative determination result, the series of processing is terminated.

[Other Configuration Examples of the Present Invention]

The present invention is not limited to the above-mentioned embodiment, and various modifications are possible within the range of the matter described in the claim.

The present invention is also applicable to cloud computing, in which one function is shared and collaborated by multiple apparatuses via a network.

For example, as shown in the above-described embodiment, one apparatus may execute each step explained in the above-mentioned flowchart, or multiple apparatus may share and execute each step. Furthermore, when one step is composed of multiple processings, one apparatus may execute multiple processings, or multiple apparatuses may share and execute each processing.

In the above-mentioned embodiment, the object to be processed in the image processing is the pixel value of the color component of three colors of RGB, but the present invention is not limited thereto. For example, pixel values of color components of four or more colors including white and yellow and the like, pixel values of color components of CMYk, pixel values of luminance signal, and the like are also the object to be processed in the image processing.

The present invention is also applicable to digital cameras, so-called smartphones, surveillance cameras, endoscopes, microscopes, imaging-capturing apparatuses such as cinema camera, applications for editing images, and the like.

<One Embodiment of System Camera>

Since broadcasting station cameras, endoscopes, and microscopes often perform shooting over a long period of time in real time, they are often divided into a camera head and an image processing apparatus. The system divided into a camera head and an image processing apparatus is called a system camera. The present invention is also applicable to such a system camera.

<One Embodiment of Lens Interchangeable Type Digital Camera>

Images shot by a lens interchangeable type digital camera such as a high-end single lens digital camera and a commercial camera are often edited by signal processing apparatus. In this case, the lens interchangeable type digital camera records data such as shooting image and shooting information on the memory card. The signal processing apparatus reads image such as image and shooting information recorded on the memory card and edits the image. The present invention is also applicable to this signal processing apparatus.

Means for supplying images and the like from the lens interchangeable type digital camera to the signal processing apparatus is not limited to the memory card but may be communication means such as a magnetic disk, a light disk, a network, various cables, or wireless means.

<One Embodiment of Computer>

The present invention is applicable to both hardware and software. For example, the image correction unit 45 shown in FIG. 6 may be constituted by hardware, or may be constituted by a computer (processor) installed with a program capable of executing the above-described series of processing.

REFERENCE SIGNS LIST 10 image conversion apparatus, 11 target pixel selection unit, 12 filter tap selection unit, 13 code tap selection unit, 14 code operation unit, 15 coefficient memory unit, 16 product-sum operation unit, 20 learning apparatus, 21 learning imago storage unit, 22 teacher data generation unit, 23 teacher data storage unit, 24 student data generation unit, 25 student data storage unit, 26 learning unit, 31 target pixel selection unit, 32 filter tap selection unit, 33 code tap selection unit, 34 code operation unit, 35 adder unit, 36 tap coefficient operation unit, 41 optical system, 42 image sensor, 43 storage unit, 44 signal processing unit, 45 image correction unit, 46 output unit, 47 control unit, 50 image conversion apparatus, 51 target pixel selection unit, 52 distortion aberration table memory unit, 53 distortion aberration correction position information generation processing unit, 54 distortion aberration correction position information memory unit, 55 coefficient memory unit, 56 coefficient interpolation processing unit, 57 position-specific coefficient memory unit, 58 frame memory unit, 59 position information sorting unit, 60 first aberration correction processing unit, 61 second aberration correction processing unit, 70 image conversion apparatus, 71 target pixel selection unit, 72 filter tap selection unit, 73 code tap selection unit, 74 code operation unit, 75 coefficient memory unit, 76 product-sum operation unit, 77 interpolation operation unit, 81 quantization operation unit, 82 central pixel difference ratio detection unit, 83 conversion table memory unit, 91 to 106 product-sum computation device, 110 image conversion apparatus, 111 target pixel selection unit, 112 filter tap selection unit, 113 code tap selection unit, 114 code operation unit, 115 coefficient memory unit, 116 product-sum operation unit, 117 interpolation operation unit, 121 quantization operation unit, 122 conversion table memory unit, 160 image conversion apparatus, 161 distortion aberration correction position information memory unit, 162 second aberration correction processing unit, 170 image conversion apparatus, 171 coefficient memory unit, 172 interpolation operation unit

The invention claimed is:

1. An image processing apparatus comprising:
   an image storage unit storing a first image affected by aberration of an optical system;
   a position information generation unit generating position information about a pixel of the first image corresponding to a scanned target pixel, every time the target pixel is scanned in a predetermined order on a second image, on the basis of position information about the target pixel scanned in the predetermined order for generating a pixel value of each pixel of the second image from which influence of the aberration is removed and a distortion aberration table indicating a corresponding relationship between position information about each pixel of the first image and position information about each pixel of the second image;
   a first aberration correction unit, using fractional part information about the position information generated by the position information generation unit, correcting phase shift caused by distortion aberration for each pixel of the first image read from the image storage unit; and
   a second aberration correction unit including:
   a first selection unit selecting a plurality of pixels of a predetermined pattern on the basis of the scanned target pixel from the first image corrected by the first aberration correction unit;
   a first code operation unit computing a code indicating a feature amount of the plurality of pixels of the predetermined pattern selected by the first selection unit;
   a first coefficient memory unit memorizing a tap coefficient for correcting aberration other than distortion aberration for each code, and outputting a plurality of tap coefficients on the basis of the code computed by the first code operation unit;
   a second selection unit selecting the plurality of pixels of a particular pattern of the first image on the basis of the scanned target pixel from the first image corrected by the first aberration correction unit; and
   a first pixel value operation unit for generating the second image by correcting aberration other than distortion aberration in each pixel of the first image by computing the pixel value of the target pixel, on the basis of each pixel value of the plurality of pixels selected by the second selection unit and the plurality of tap coefficients output from the first coefficient memory unit.

2. The image processing apparatus according to claim 1, wherein the first aberration correction unit includes:
   a third selection unit selecting the plurality of pixels of the predetermined pattern on the basis of the scanned target pixel from the first image read from the image storage unit;
   a second code operation unit computing a code indicating a feature amount of the plurality of pixels of the predetermined pattern selected by the third selection unit;
   a second coefficient memory unit memorizing a tap coefficient for correcting a phase shift caused by distortion aberration for each code, and outputting a plurality of tap coefficients on the basis of the code computed by the second code operation unit and fractional part information about position information generated by the position information generation unit;
   a fourth selection unit selecting the plurality of pixels of the particular pattern of the first image on the basis of the scanned target pixel from the first image read from the image storage unit; and
   a second pixel value operation unit correcting phase shift caused by distortion aberration in each pixel of the first image by computing the pixel value of the target pixel, on the basis of each pixel value of the plurality of pixels selected by the fourth selection unit, the plurality of tap coefficients output from the second coefficient memory unit, and the fractional part information about the position information generated by the position information generation unit.

3. The image processing apparatus according to claim 2, wherein the second code operation unit includes:
   a second quantization code operation unit computing a quantization code obtained by quantizing each pixel value of the plurality of pixels selected by the third selection unit; and
   a second conversion table memory unit setting, to the same code, a plurality of codes for reading approximate tap coefficients in a second conversion table indicating a corresponding relationship between a plurality of quantization codes and a plurality of codes for reading a plurality of tap coefficients from the second coefficient memory unit, and converting the quantization code computed by the second quantization code operation unit into a corresponding code on the basis of the second conversion table.

4. The image processing apparatus according to claim 2, wherein the second pixel value operation unit includes:
a plurality of second product-sum computation devices obtaining a plurality of pixel values performing product-sum computation of each pixel value of the plurality of pixels selected by the fourth selection unit and the plurality of tap coefficients output from the second coefficient memory unit; and
a second interpolation operation unit computing the pixel value of the target pixel by performing interpolation processing by using the plurality of pixel values obtained by the plurality of second product-sum computation devices.

5. The image processing apparatus according to claim 1, wherein the first coefficient memory unit memorizes a plurality of tap coefficients for improving sharpness of the image, which is derived through learning using optical simulation with design information about the optical system, and
the first pixel value operation unit generates the second image in which the sharpness has been improved from the first image, by computing the pixel value of the target pixel by using the plurality of tap coefficients output from the first coefficient memory unit.

6. The image processing apparatus according to claim 1, wherein the first code operation unit includes:
a first quantization code operation unit computing a quantization code obtained by quantizing each pixel value of the plurality of pixels selected by the first selection unit; and
a first conversion table memory unit setting, to the same code, a plurality of codes for reading approximate tap coefficients in a first conversion table indicating a corresponding relationship between a plurality of quantization codes and a plurality of codes for reading a plurality of tap coefficients from the first coefficient memory unit, and converting the quantization code computed by the first quantization code operation unit into a corresponding code on the basis of the first conversion table.

7. The image processing apparatus according to claim 1, wherein the first pixel value operation unit includes:
a plurality of first product-sum computation devices obtaining a plurality of pixel values by performing product-sum computation of each pixel value of the plurality of pixels selected by the second selection unit and the plurality of tap coefficients output from the first coefficient memory unit; and
a first interpolation operation unit computing a pixel value of the target pixel by performing interpolation processing by using the plurality of pixel values obtained by the plurality of first product-sum computation devices.

8. The image processing apparatus according to claim 1, further comprising:
a position information memory unit memorizing position information about each pixel of the first image of the predetermined frame generated by the position information generation unit,
wherein for a frame after the predetermined frame, the first aberration correction unit corrects a phase shift caused by distortion aberration by using a fractional part information about position information of each pixel stored in the position information memory unit.

9. The image processing apparatus according to claim 1, further comprising a distortion aberration table memory unit memorizing a plurality of distortion aberration tables prepared for each shooting information,
wherein the position information generation unit reads the plurality of distortion aberration tables corresponding to shooting information approximate to the input shooting information from the distortion aberration table memory unit, interpolates the distortion aberration table corresponding to the input shooting information by using the plurality of distortion aberration tables read, and generates position information about the pixel of the first image by using the interpolated distortion aberration table.

10. The image processing apparatus according to claim 1, wherein the second aberration correction unit further includes a tap coefficient interpolation unit reading a plurality of tap coefficients corresponding to the shooting information approximate to the input shooting information from the second coefficient memory unit memorizing a plurality of tap coefficients prepared for each shooting information, and interpolating a plurality of tap coefficients corresponding to the input shooting information by using the plurality of tap coefficients read,
wherein the second pixel value operation unit computes the pixel value of the target pixel by using the plurality of tap coefficients interpolated by the tap coefficient interpolation unit.

11. An image processing method comprising:
a position information generation step of generating position information about a pixel of a first image corresponding to a scanned target pixel, every time the target pixel is scanned in a predetermined order on a second image, on the basis of position information about the target pixel scanned in the predetermined order for generating a pixel value of each pixel of the second image from which influence of aberration is removed and a distortion aberration table indicating a corresponding relationship between position information about each pixel of the first image and position information about each pixel of the second image;
a first aberration correction step of using fractional part information about the position information generated by the position information generation step to correct phase shift caused by distortion aberration for each pixel of the first image read from the image storage unit storing the first image; and
a second aberration correction step including:
a first selection step of selecting a plurality of pixels of a predetermined pattern on the basis of the scanned target pixel from the first image corrected by the first aberration correction step;
a code computation step of computing a code indicating a feature amount of the plurality of pixels of the predetermined pattern selected by the first selection step;
a coefficient output step of outputting a plurality of tap coefficients on the basis of the code computed by the code computation step from a coefficient memory unit memorizing a tap coefficient for correcting aberration other than distortion aberration for each code;
a second selection step of selecting the plurality of pixels of the particular pattern of the first image on the basis of the scanned target pixel from the first image corrected by the first aberration correction step; and a pixel value computation step of generating the second image by correcting aberration other than distortion aberration in each pixel of the first image by computing the pixel value of the target pixel, on the basis of each pixel value of the plurality of pixels selected by the second selection step and the plurality of tap coefficients output from the coefficient memory unit.

12. A non-transitory computer readable recording medium recorded with a program for causing a computer to function as:

an image storage unit storing a first image affected by aberration of an optical system;

a position information generation unit generating position information about a pixel of the first image corresponding to a scanned target pixel, every time the target pixel is scanned in a predetermined order on a second image, on the basis of position information about the target pixel scanned in the predetermined order for generating a pixel value of each pixel of the second image from which influence of the aberration is removed and a distortion aberration table indicating a corresponding relationship between position information about each pixel of the first image and position information about each pixel of the second image;

a first aberration correction unit, using fractional part information about the position information generated by the position information generation unit, correcting phase shift caused by distortion aberration for each pixel of the first image read from the image storage unit; and a second aberration correction unit including:

a first selection unit selecting a plurality of pixels of a predetermined pattern on the basis of the scanned target pixel from the first image corrected by the first aberration correction unit;

a code operation unit computing a code indicating a feature amount of the plurality of pixels of the predetermined pattern selected by the first selection unit;

a coefficient memory unit memorizing a tap coefficient for correcting aberration other than distortion aberration for each code, and outputting a plurality of tap coefficients on the basis of the code computed by the code operation unit;

a second selection unit selecting the plurality of pixels of the particular pattern of the first image on the basis of the scanned target pixel from the first image corrected by the first aberration correction unit; and a pixel value operation unit for generating the second image by correcting aberration other than distortion aberration in each pixel of the first image by computing the pixel value of the target pixel, on the basis of each pixel value of the plurality of pixels selected by the second selection unit and the plurality of tap coefficients output from the first coefficient memory unit.

13. An imaging-capturing apparatus comprising:

an imaging-capturing device generating a first image according to imaging-capturing light incident via an optical system;

an image storage unit storing the first image generated by the imaging-capturing device;

a position information generation unit generating position information about a pixel of the first image corresponding to a scanned target pixel, every time the target pixel is scanned in a predetermined order on a second image, on the basis of position information about the target pixel scanned in the predetermined order for generating a pixel value of each pixel of the second image from which influence of the aberration is removed and a distortion aberration table indicating a corresponding relationship between position information about each pixel of the first image and position information about each pixel of the second image;

a first aberration correction unit, using fractional part information about the position information generated by the position information generation unit, correcting phase shift caused by distortion aberration for each pixel of the first image read from the image storage unit; and a second aberration correction unit including:

a first selection unit selecting a plurality of pixels of a predetermined pattern on the basis of the scanned target pixel from the first image corrected by the first aberration correction unit;

a code operation unit computing a code indicating a feature amount of the plurality of pixels of the predetermined pattern selected by the first selection unit;

a coefficient memory unit memorizing a tap coefficient for correcting aberration other than distortion aberration for each code, and outputting a plurality of tap coefficients on the basis of the code computed by the code operation unit;

a second selection unit selecting the plurality of pixels of the particular pattern of the first image on the basis of the scanned target pixel from the first image corrected by the first aberration correction unit; and a pixel value operation unit generating the second image by correcting aberration other than distortion aberration in each pixel of the first image by computing the pixel value of the target pixel, on the basis of each pixel value of the plurality of pixels selected by the second selection unit and the plurality of tap coefficients output from the first coefficient memory unit.

* * * * *